(12) United States Patent
Nakashima et al.

(10) Patent No.: US 8,351,795 B2
(45) Date of Patent: Jan. 8, 2013

(54) OPTICAL TRANSMISSION SYSTEM AND OPTICAL TRANSMISSION METHOD

(75) Inventors: Hisao Nakashima, Kawasaki (JP);
Takeshi Hoshida, Kawasaki (JP);
Takahito Tanimura, Kawasaki (JP);
Toru Katagiri, Kawasaki (JP);
Shoichiro Oda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 968 days.

(21) Appl. No.: 12/219,863

(22) Filed: Jul. 29, 2008

(65) Prior Publication Data
US 2009/0087194 A1    Apr. 2, 2009

(30) Foreign Application Priority Data
Oct. 1, 2007   (JP) .................................. 2007-258157

(51) Int. Cl.
*H04B 10/00* (2006.01)
(52) U.S. Cl. ......... 398/158; 398/140; 398/192; 398/208
(58) Field of Classification Search .................. 398/183, 398/186, 187, 188, 198, 190, 191, 208, 202, 398/140, 158, 192
See application file for complete search history.

(56) References Cited

U.S. PATENT DOCUMENTS

| | | |
|---|---|---|
| 6,445,471 B1 | 9/2002 | Shimokawa et al. |
| 2005/0047802 A1 | 3/2005 | Jaynes et al. |
| 2006/0193640 A1 | 8/2006 | Katagiri et al. |
| 2007/0065157 A1* | 3/2007 | Katagiri et al. ............... 398/155 |
| 2007/0071454 A1 | 3/2007 | Liu et al. |
| 2008/0031633 A1 | 2/2008 | Hoshida et al. |

FOREIGN PATENT DOCUMENTS

JP    2006-270909    10/2006

OTHER PUBLICATIONS

C. Laperle et al., "Wavelength Division Multiplexing (WDM) and Polarization Mode Dispersion (PMD) Performance of a Coherent 40 Gbit/s Dual-Polarization Quadrature Phase Shift Keying (DP-QPSK) Transceiver", OFC'07, PDP 16, 2007.*
C. Laperle et al., "Wavelength Division Multiplexing (WDM) and Polarization Mode Dispersion (PMD) Performance of a Coherent 40Gbit/s Dual-Polarization Quadrature Phase Shift Keying (DP-QPSK) Transceiver", OFC'07, PDP16, 2007.

(Continued)

*Primary Examiner* — M. R. Sedighian
(74) *Attorney, Agent, or Firm* — Staas & Halsey LLP

(57) ABSTRACT

An optical transmission system, where in an optical transmitter a detection bit having a specific pattern set according to the number of bits to be transmitted within one symbol time, is imparted with respect to a transmission signal in which transmission information has been encoded according to a preset format, and an optical signal generated by modulating light according to the transmission signal is transmitted to a transmission line. In an optical receiver, logic inversion or bit swap of received data is detected and compensated by using the detection bit included in the received signal, a decoding process of the compensated received signal is executed. As a result, when an optical signal capable of transmitting multi-bit information within one symbol time is transferred, it is possible to realize excellent transmission characteristics, by reliably compensating an error in received data caused by the modulation format or the multiplex system of the optical signal.

10 Claims, 18 Drawing Sheets

OTHER PUBLICATIONS

H. Masuda et al., "20.4Tb/s (204×111 Gb/s) Transmission over 240 km using Bandwidth-Maximized Hybrid Raman/EDFAs", OFC'07, PDP20, 2007.

Extended European Search Report dated Mar. 31, 2010 in European Application No. 10153582 ( 8 PP).

J-X Cai et al., "Improved Margin in Long Haul 40 GB/s Systems Using Bit-Synchronously Modulated RZ-DQPSK", IEEE Proceedings of the OFC, Jan. 1, 2006 (3 pp).

Van Den Bourne et al., "1.6 b/s/Hz Spectrally Efficient Transmission Over 1700 km of SSMF Using 40 85.6 Gb/s Polmux-RZ-DQPSK", Journal of Lightwave Technology, IEEE Service Center, NY, NY, vol. 25, No. 1, Jan. 1, 2007 (11 pp).

European Search Report dated Feb. 2, 2009 in corresponding European Appln. No. 08013658.3.

European Search Report dated May 4, 2009 in corresponding European Patent 08013658.3.

T. Pfau et al., "PDL-Tolerant Real-time Polarization-Multiplexed QPSK Transmission with Digital Coherent Polarization Diversity Receiver", Digest of the IEEE/LEOS Summer Topical Meetings 2007, Jul. 2007, pp. 17-18.

Office Action mailed Dec. 6, 2011 and issued in corresponding Japanese Patent Application No. 2007-258157.

U.S. Appl. No. 13/137,024, filed Jul. 15, 2011, Hisao Nakashima et al., Fujitsu Limited.

European Patent Office Summons to Attend Oral Proceedings, dated Mar. 23, 2012, in application No. 08013658.3.

Office Action mailed Jul. 5, 2012 in co-pending U.S. Appl. No. 13/137,024.

* cited by examiner

FIG.18

RELATED ART

OCCURRENCE PATTERN OF LOGIC INVERSION

|    | A' | B' | C' | D' |
|----|----|----|----|----|
| 1  | A  | B  | C  | D  |
| 2  | A  | B  | C  | $\overline{D}$ |
| 3  | A  | B  | $\overline{C}$ | D  |
| 4  | A  | B  | $\overline{C}$ | $\overline{D}$ |
| 5  | A  | $\overline{B}$ | C  | D  |
| 6  | A  | $\overline{B}$ | C  | $\overline{D}$ |
| 7  | A  | $\overline{B}$ | $\overline{C}$ | D  |
| 8  | A  | $\overline{B}$ | $\overline{C}$ | $\overline{D}$ |
| 9  | $\overline{A}$ | B  | C  | D  |
| 10 | $\overline{A}$ | B  | C  | $\overline{D}$ |
| 11 | $\overline{A}$ | B  | $\overline{C}$ | D  |
| 12 | $\overline{A}$ | B  | $\overline{C}$ | $\overline{D}$ |
| 13 | $\overline{A}$ | $\overline{B}$ | C  | D  |
| 14 | $\overline{A}$ | $\overline{B}$ | C  | $\overline{D}$ |
| 15 | $\overline{A}$ | $\overline{B}$ | $\overline{C}$ | D  |
| 16 | $\overline{A}$ | $\overline{B}$ | $\overline{C}$ | $\overline{D}$ |

OCCURRENCE PATTERN OF BIT SWAP

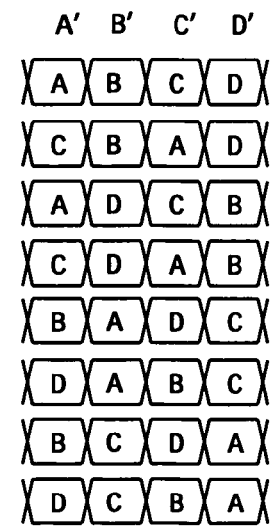

FIG.20
RELATED ART
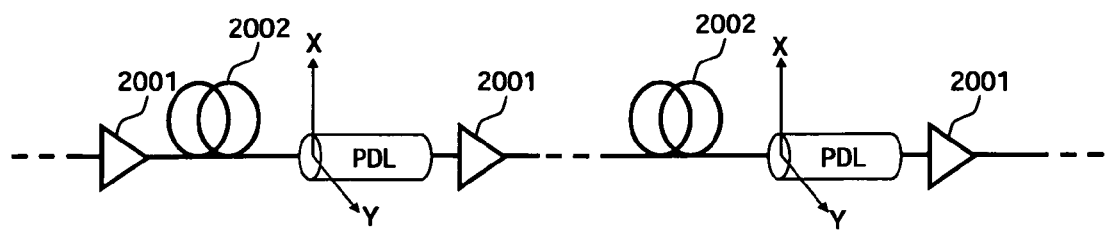
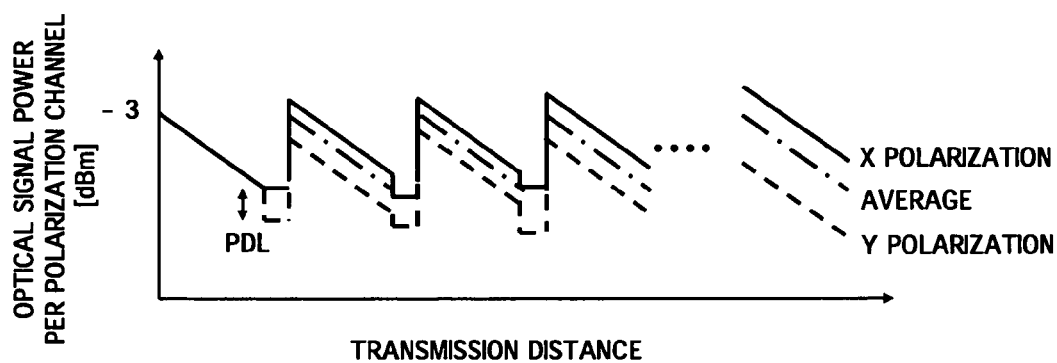
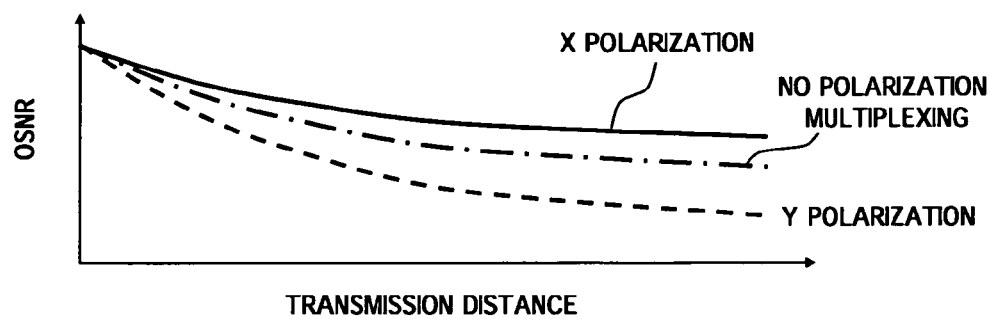

OPTICAL TRANSMISSION SYSTEM AND OPTICAL TRANSMISSION METHOD

BACKGROUND OF THE INVENTION

1. Field of the Invention

The present invention relates to an optical transmission system and an optical transmission method using an optical signal capable of transmitting information of a plurality of bits within one code (one symbol time). More specifically, the present invention relates to a technique for realizing excellent transmission characteristics by compensating or correcting an error in a received signal caused by an optical signal modulation format or a multiplex system.

2. Description of the Related Art

With recent popularization of the Internet, there is an increasing demand for a basic optical communication system having a transmission capacity equal to or higher than 40 Gbit/sec. As a method for realizing this, adoption of various optical modulation formats having excellent spectral efficiency, Optical Signal-to-Noise Ratio (OSNR) resistance, and nonlinearity resistance, as compared with a Non Return to Zero (NRZ) modulation format, which has been applied to a conventional optical communication system with a transmission capacity of 10 Gbit/sec or less, has been sought. Against this background, a system that transmits multi-bit information within one symbol time has been attracting attention. For example, 40-Gbit/sec and 100-Gbit/sec optical transmission systems, which combine Quadrature Phase Shift Keying (QPSK) and polarization multiplexing, have been discussed actively (for example, refer to C. Laperle et al., "Wavelength Division Multiplexing (WDM) and Polarization Mode Dispersion (PMD) Performance of a Coherent 40 Gbit/s Dual-Polarization Quadrature Phase Shift Keying (DP-QPSK) Transceiver", OFC '07, PDP16, 2007., and H. Masuda et al., "20.4-Tb/s (204×111 Gb/s) Transmission over 240 km using Bandwidth-Maximized Hybrid Raman/ED-FAs", OFC '07, PDP20, 2007).

In the optical transmission system using a multivalue modulation format, a polarization multiplexing transmission system, or a digital coherent receiving system, logic of a transmitted signal may be inversed bit by bit at the time of reception, due to factors such as a change in an operating point of an optical transmitter, an initial phase of a local oscillator light, and a phase fluctuation in a signal light and the local oscillator light. Moreover, in addition to the above factors, due to alternation of polarization at the time of reception, a phenomenon referred to as bit swap, in which an order of received bits is alternated, may occur.

For example, in the optical transmission system adopting the digital coherent receiving system combining QPSK and polarization multiplexing as shown in FIG. 17, there can be considered a possibility that logic inversion and bit swap may occur dynamically in a pattern as shown in FIG. 18. More specifically, in the optical transmission system, lights generated by a light source 1102 in an optical transmitter 1100 are divided into polarization components orthogonal to each other by a polarization beam splitter 1103, and respective lights of X polarization and Y polarization are further branched into two, and respectively provided to two phase modulators 1104. The lights input to each phase modulator 1104 are phase-modulated according to a transmission signal processed in a transmission signal processing circuit 1101. After one phase of a pair of phases corresponding to the polarized waves is shifted by π/2 by a phase shifter 1105, respective lights are synthesized by a polarization beam combiner 1106. Accordingly, a 4-bit coded optical signal is transmitted from the optical transmitter 1100 to an optical receiver 1300 via a transmission line 1200. In the optical receiver 1300, the optical signal from the transmission line 1200 and a local oscillator light output from a local oscillator light source 1301 are provided to a polarization diversity 900 hybrid circuit 1302, and the output lights of the circuit 1302 are converted into electric signals by photo detectors 1303. After the received signals are AD-converted by AD converters 1304, the signals are provided to a digital signal processing circuit 1305 and a received signal processing circuit 1306, where 4-bit code demodulation processing is performed. Accordingly, 4-bit (16-valued) information is transmitted between the optical transmitter 1100 and the optical receiver 1300 within one symbol time. In FIG. 17, 4-bit transmitted data encoded by the optical transmitter 1100 are designated as A, B, C, and D, and 4-bit received data demodulated by the optical receiver 1300 are designated as A', B', C', and D'.

In such an optical transmission system, logic inversion in 16 patterns as shown in the upper part of FIG. 18 may occur dynamically, due to; a bias point of the phase modulators 1104 in the optical transmitter 1100, an optical path difference between the polarization beam splitter 1103 and the polarization beam combiner 1106, polarization mode dispersion (PMD) in the transmission line 1200, nonlinear phase noise, an optical path difference between polarized waves in the optical receiver 1300, or a phase fluctuation in the local oscillator light source 1301. Moreover, bit swap in 8 patterns as shown in the lower part of FIG. 18 may occur dynamically, due to; the phase fluctuation in the local oscillator light source 1301, alternation of polarization channels (X polarization, Y polarization) at the time of reception, or the nonlinear phase noise.

Although not shown specifically, in the optical transmission system adopting the digital coherent receiving system or a direct detection system, in which Differential Quadrature Phase Shift Keying (DQPSK) and polarization multiplexing are combined, dynamic logic inversion is not caused by performing differential reception, and hence, the number of logic inversion patterns decreases. Moreover, the bit swap in eight patterns as shown in the lower part of FIG. 18 may occur, though not dynamically, due to a bias of the phase modulator on the transmission side, or alternation of the polarization channels.

In order to avoid a bit error in the received data with respect to the logic inversion and bit swap, high-speed logic inversion control and multiplexing timing (bit swap) control need to be performed in the optical receiver. As one example of the conventional technique involved with the control, a method for controlling the logic inversion and bit swap by using frame synchronization detection is known for the DQPSK system using direct detection (for example, refer to Japanese Unexamined Patent Publication No. 2006-270909).

The conventional control technique using frame synchronization detection is effective for controlling logic inversion and bit swap occurring when 2-bit (4-valued) information is transmitted within one symbol time. However, it cannot correspond to the logic inversion and bit swap occurring when information larger than 2 bits is transmitted within one symbol time as in the optical transmission system combining Quadrature Phase Shift Keying (QPSK) and polarization multiplexing. Moreover, because it is a method of detecting the logic inversion based on whether there is frame synchronization in the directly detected received signal, there is a problem in that application to the optical transmission system using the coherent receiving system is difficult.

Moreover, when multi-bit information is transmitted within one symbol time by using the multivalue modulation format or the like, regardless of whether the conventional control technique using the frame synchronization detection is applied or not, a characteristic variation may occur between transmission channels. Particularly, when it is attempted to expand the transmission capacity by combining the polarization multiplexing system, there is concern that the characteristic variation between the X polarization channel and the Y polarization channel may increase. With such a characteristic variation between the channels, there is a problem that this may cause deterioration of error correction performance when error correction is performed for the received signal by using, for example, a known error correction code. In other words, since error correction using the error correction code is a technique assuming random error, the characteristic variation between the channels deteriorates the random nature of the error in the received signal, thereby causing deterioration of the error correction performance.

FIG. 19 shows one example of a bit error rate (BER) characteristic before and after the error correction according to the presence of a characteristic variation between channels. The X axis denotes a mean value of the BER (Input BER) for all channels before the error correction, and the Y axis denotes a mean value of the BER (Output BER) for all channels after the error correction. From FIG. 19 it is seen that when the random error does not occur due to the characteristic variation between respective channels of the received signal, deterioration of an improvement amount of the Output BER with respect to the Input BER, that is, of a coding gain, occurs.

Here, causes which generate characteristic variation between the channels will be described in detail.

For example, the most common cause of characteristic variation between the channels in the polarization multiplexing system is a polarization dependent loss (PDL) in a transmission line and an optical device. In the optical transmission system as shown in the upper part of FIG. 20, when there is a PDL as shown in the middle part of FIG. 20, the power of the optical signal transmitted to a transmission line 2002 is controlled to be constant in the output of an optical amplifier 2001 in each repeater span. However, due to the PDL in the transmission line 2002, a power difference occurs between the X polarization channel and the Y polarization channel, and hence, although the average power (Ave) of the X polarization channel and the Y polarization channel becomes constant in each repeater span, the power difference between the X polarization channel and the Y polarization channel gradually increases with an increase of the number of repeater spans. Therefore, as shown in the lower part of FIG. 20, a difference in the OSNR between the X polarization channel and the Y polarization channel gradually increases, and as a result, a characteristic variation occurs between the different polarization channels.

SUMMARY

In view of the above situation, it is an object of the present invention to provide an optical transmission system and an optical transmission method that can realize excellent transmission characteristics, by reliably compensating or correcting an error in received data caused by the modulation format or the multiplex system of the optical signal, when an optical signal capable of transmitting multi-bit information within one symbol time is transferred.

In order to achieve the above object, one aspect of the optical transmission system is an optical transmission system comprising: an optical transmitter that transmits an optical signal capable of transmitting multi-bit information within one symbol time and that uses at least a polarization multiplexing system, to a transmission line; and an optical receiver that receives the optical signal propagated through the transmission line. The optical transmitter comprises: a transmission signal processing circuit having an encoding section which generates a transmission signal in which transmission information has been encoded according to a preset format, and a detection bit imparting section which imparts a detection bit having a specific pattern set according to the number of bits to be transmitted within one symbol time with respect to the transmission signal generated by the encoding section; a light source; and an optical modulating section which transmits an optical signal generated by modulating an output light from the light source to the transmission line according to the transmission signal imparted with the detection bit output from the transmission signal processing circuit. Furthermore the optical receiver comprises: a light receiving section which receives the optical signal propagated through the transmission line and converts the optical signal into an electric signal; and a received signal processing circuit having a detection compensating section which detects at least one of logic inversion and bit swap in received data by using the detection bit included in a received signal output from the light receiving section to compensate the logic inversion or bit swap according to the detection result, and a decoding section which executes decoding of the received signal output from the detection compensating section.

One aspect of the optical transmission method is an optical transmission method for transmitting an optical signal capable of transmitting multi-bit information within one symbol time and using at least a polarization multiplexing system, to a transmission line, and receiving the optical signal propagated through the transmission line. The optical transmission method comprises: a step of generating a transmission signal in which transmission information has been encoded according to a preset format; a step of imparting a detection bit having a specific pattern set according to the number of bits to be transmitted within one symbol time with respect to the generated transmission signal; a step of transmitting an optical signal generated by modulating a light to the transmission line according to the transmission signal imparted with the detection bit; a step of receiving the optical signal propagated through the transmission line and converting the optical signal into an electric signal; a step of detecting at least one of logic inversion and bit swap in received data by using the detection bit included in the converted received signal and compensating the logic inversion or bit swap according to the detection result; and a step of executing decoding of the compensated received signal.

In the above optical transmission system and optical transmission method, an optical signal of the polarization multiplexing system imparted with the detection bit on the transmission side is generated and transmitted to the transmission line. The detection bit is set so as to have a specific pattern corresponding to the number of bits to be transmitted within one symbol time. By confirming the pattern of the detection bit included in the transmitted optical signal on the reception side, the logic inversion or bit swap in the received data is detected and compensated.

Another aspect of the optical transmission system is an optical transmission system comprising: an optical transmitter that transmits an optical signal capable of transmitting multi-bit information within one symbol time and including a plurality of multiplexed transmission channels, to a transmission line; and an optical receiver that receives the optical signal propagated through the transmission line. The optical transmitter comprises: a transmission signal processing circuit that generates a plurality of transmission signals respectively corresponding to the plurality of transmission channels by encoding transmission information according to a preset format; a light source; an optical modulating section that generates an optical signal to be transmitted to the transmission line, by respectively modulating output lights from the light source according to the transmission signals output from the transmission signal processing circuit, and multiplexing the respective modulated lights; and a characteristic averaging section that causes a change in a state of the optical signal transmitted to the transmission line so that characteristic variations between the respective transmission channels generated due to propagation of the optical signal generated by the optical modulating section through the transmission line are averaged over all the transmission channels. Moreover, the optical receiver is configured to receive the optical signal propagated through the transmission line matched with a state change of the optical signal provided by the characteristic averaging section, and to perform a decoding process including error correction of the received signal.

Another aspect of the optical transmission method is an optical transmission method for transmitting an optical signal capable of transmitting multi-bit information within one symbol time and including a plurality of multiplexed transmission channels, to a transmission line, and receiving the optical signal propagated through the transmission line. The optical transmission method comprises: a step of generating a plurality of transmission signals respectively corresponding to the plurality of transmission channels by encoding transmission information according to a preset format; a step of generating an optical signal to be transmitted to the transmission line, by respectively modulating lights according to the respective generated transmission signals, and multiplexing respective modulated lights; a step of causing a change in a state of the optical signal transmitted to the transmission line so that characteristic variations between the respective transmission channels generated due to propagation of the generated optical signal through the transmission line are averaged over all the transmission channels; and a step of receiving the optical signal propagated through the transmission line matched with the state change of the optical signal, and performing a decoding process including error correction of the received signal.

In the above-described optical transmission system and optical transmission method, a state change of the transmission light is caused at the time of transmitting the optical signal, in which the plurality of transmission channels is multiplexed, to the transmission line, so that the characteristic variations between the respective transmission channels generated at the time of propagation of the optical signal through the transmission line are averaged over all the transmission channels. On the reception side, the optical signal is received, matched with the change of the state provided at the time of transmission, and error correction processing and the like are performed with respect to the received signal in which the random nature of the error is maintained.

According to the above optical transmission system and optical transmission method, an error in the received data caused by the modulation format or the multiplexing system of the optical signal can be reliably compensated or corrected, by imparting the detection bit to detect the logic inversion or bit swap, or by causing a change in the state of the transmission light to average the characteristic variations between the respective transmission channels, at the time of transmitting the optical signal capable of transmitting multi-bit information within one symbol time to the transmission line. Therefore, excellent transmission characteristics can be realized.

Other objects, features, and advantages of the present invention will become apparent from the following description of the embodiments in conjunction with the appended drawings.

BRIEF DESCRIPTION OF THE DRAWINGS

FIG. 18 is a diagram showing patterns of logic inversion and bit swap occurring in the system shown in FIG. 17.

FIG. 20 is a diagram for explaining a cause of the characteristic variations between channels occurring in a polarization multiplexing system.

DETAILED DESCRIPTION OF THE INVENTION

Hereunder is a description of a best mode for carrying out the present invention, with reference to the accompanying drawings. Throughout the figures, the same reference symbols denote the same or corresponding parts.

Figure 1:
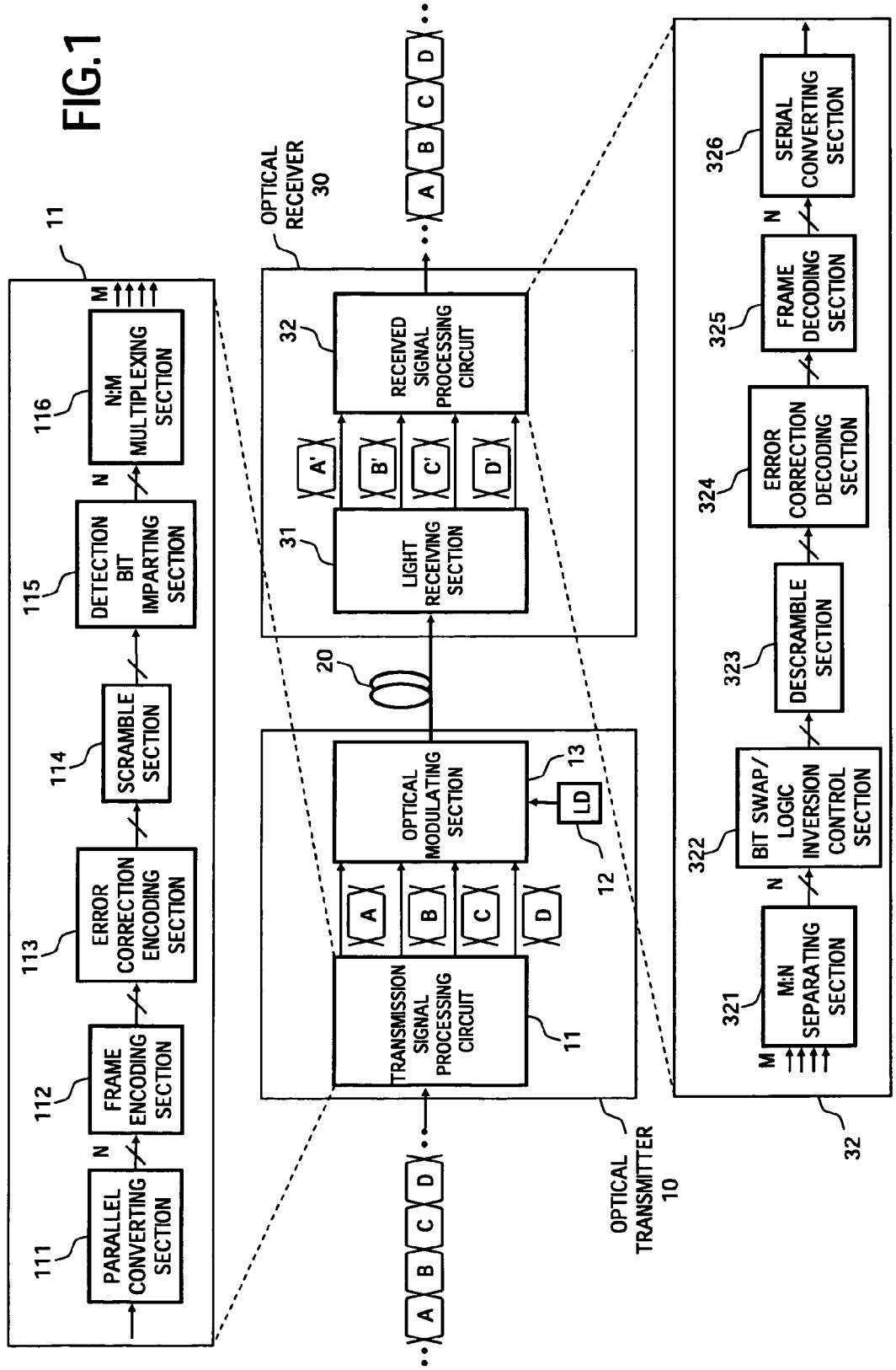
FIG. 1 is a block diagram showing the configuration of an optical transmission system according to a first embodiment of the present invention.

FIG. 1 is a block diagram showing the configuration of an optical transmission system according to a first embodiment of the present invention.

In the optical transmission system of the first embodiment, for example in a system capable of transmitting information of 4 bits (16-valued) or more within one symbol time, the occurrence of the above-described logic inversion and bit swap is detected on a reception side by using a predetermined detection bit imparted on a transmission side, and the logic inversion and the bit swap are compensated according to the detection result, by combining the multivalue modulation format and the polarization multiplexing system. In the configuration example in FIG. 1, an optical transmitter 10 comprising a transmission signal processing circuit 11, a light source (LD) 12, and an optical modulating section 13 is connected to an optical receiver 30 comprising a light receiving section 31 and a received signal processing circuit 32, via a transmission line 20. The transmission signal processing circuit 11 has a function of imparting the detection bit to the transmission signal, and the received signal processing circuit 32 has a function of detecting and compensating the logic inversion and the bit swap by using the detection bit included in the received signal.

Specifically, as shown enlarged in the upper part of FIG. 1, the transmission signal processing circuit 11 in the optical transmitter 10 has a parallel converting section 111, a frame encoding section 112, an error correction encoding section 113, a scramble section 114, a detection bit imparting section 115, and an N:M multiplexing section 116.

The parallel converting section 111 converts serial data indicating transmission information input from the outside into N-bit parallel data and outputs the parallel data. The frame encoding section 112 encodes respective data strings output from the parallel converting section 111 according to a known frame format. The error correction encoding section 113 adds a required error correction code to respective frame-encoded signals. The scramble section 114 scrambles the respective signals output from the error correction encoding section 113 with a scrambling code to randomize transmitted signals and outputs the scrambled signals.

The detection bit imparting section 115 imparts a detection bit having a specific pattern set according to the number of bits to be transmitted within one symbol time, to respective output signals from the scramble section 114. The pattern of the detection bit will be explained in detail later.

The N:M multiplexing section 116 generates an M-channel (M<N) transmission signal by multiplexing the N-bit parallel signal output from the detection bit imparting section 115. For example, in the case of an interface conforming to a Serdes Framer Interface (SFI)-5 specified by the Optical Internetworking Forum (OIF), which is a standardization standard of a 40 Gbit/sec high-speed optical communication interface circuit, the setting may be N=16 and M=4. However, the values of M and N in the present invention are not limited to the above specific example. The respective transmission signals multiplexed by the N:M multiplexing section 116 are provided to the optical modulating section 13.

In the configuration example of the transmission signal processing circuit 11, the detection bit imparting section 115 is provided in a previous stage of the N:M multiplexing section 116. However, the detection bit imparting section 115 can be arranged in a subsequent stage of the N:M multiplexing section 116.

The optical modulating section 13 polarization-separates the output light from the light source 12, and then modulates the light according to respective transmission signals from the transmission signal processing circuit 11 to combine polarizations, thereby generating an optical signal in which multivalue modulation and polarization multiplexing are combined, and transmits the optical signal to the transmission line 20. As a specific example of the optical modulating section 13, if it is assumed that an optical signal in which QPSK and polarization multiplexing are combined is transmitted to the transmission line 20, the same configuration as that of the polarization beam splitter 1103, the phase modulator 1104, the phase shifter 1105, and the polarization beam combiner 1106 in the optical transmitter 1100 shown in FIG. 17 can be used. However, the configuration of the optical modulating section 13 is not limited to the above specific example, and a known configuration corresponding to the system of the optical signal to be transmitted can be applied.

The light receiving section 31 in the optical receiver 30 is for receiving the optical signal propagated through the transmission line 20 and converting the optical signal into an electric signal. Here this may be either one applying the coherent receiving system or one applying the direct detection system.

The received signal processing circuit 32 has, for example, as shown enlarged in the lower part of FIG. 1, an M:N separating section 321, a bit swap/logic inversion control section 322, a descramble section 323, an error correction decoding section 324, a frame decoding section 325, and a serial converting section 326.

The M:N separating section 321 separates an M-channel (in the example shown in FIG. 1, A to D four channels) received signal output from the light receiving section 31 into N-bit (for example, M=16 in the case of conforming to the above-described SFI-5) parallel signals and outputs the parallel signals. The bit swap/logic inversion control section 322 detects an occurrence state of the bit swap and the logic inversion by using the detection bit imparted on the transmission side, for each output signal from the M:N separating section 321, and compensates the bit swap and the logic inversion according to the detection result. The bit swap/logic inversion control section 322 can be arranged in the previous stage of the M:N separating section 321. The detection method and the compensation method of the bit swap and the logic inversion will be explained in detail later.

The descramble section 323 executes a descramble process for each signal output from the bit swap/logic inversion control section 322 according to the scrambling code used on the transmission side, and outputs each signal. The error correction decoding section 324 uses the error correction code included in each signal output from the descramble section 323 to execute an error correction process. The frame decoding section 325 decodes each signal output from the error correction decoding section 324 according to a frame format corresponding to that on the transmission side. The serial converting section 326 converts the N-bit parallel data output from the frame decoding section 325 into serial data, and outputs the serial data as received information to the outside or the like.

Here, the pattern of the detection bit imparted on the transmission side will be explained in detail, assuming a case in which 4-bit information is transmitted within one symbol time, as at the time of transmitting an optical signal, in which, for example, the above-described QPSK and polarization multiplexing are combined.

When the 4-bit information is transmitted within one symbol time, the detection bit for detecting the logic inversion and the bit swap is written in a 16-bit string $(A_1B_1C_1D_1A_2B_2C_2D_2A_3B_3C_3D_3A_4B_4C_4D_4)$, and it is a first requirement that in the 16-bit pattern, when $A_1, A_2, A_3, A_4$ are designated as Channel A, $B_1, B_2, B_3, B_4$ are designated as Channel B, $C_1$, $C_2$, $C_3$, $C_4$ are designated as Channel C, and $D_1$, $D_2$, $D_3$, $D_4$ are designated as Channel D, a 2-bit value obtained by calculating an exclusive OR of the first bit and the second bit in each channel and an exclusive OR of the third bit and the fourth bit, is different from each other in the respective channels. Moreover, it is a second requirement that the top $A_1$, $B_1$, $C_1$, and $D_1$ are the same sign. However, the second requirement needs caution, since it may not be essential depending on a sequence for detecting the logic inversion and the bit swap, as described later.

As a specific example of the detection bit satisfying the above requirements, $(A_1B_1C_1D_1A_2B_2C_2D_2A_3B_3C_3D_3A_4B_4C_4D_4)=0000110000011011$ can be mentioned. However, it does not mean that the detection bit pattern in the present invention is limited to this specific example, and a pattern satisfying at least the first requirement can be used as the detection bit.

When confirming the first requirement for the above specific example, for the Channel A, the exclusive OR of $A_1$ and $A_2$ is 1 ($A_1$exor$A_2$=1) and the exclusive OR of $A_3$ and $A_4$ is 1 ($A_3$exor$A_4$=1). Therefore, the 2-bit calculation value of the exclusive OR (A_exor) becomes 11. A relational expression shown below is obtained by calculating the exclusive OR for other channels in the same manner as for the Channel A, and arranging the calculation results.

A_exor=$A_1$exor$A_2$, $A_3$exor$A_4$=11=3

B_exor=$B_1$exor$B_2$, $B_3$exor$B_4$=10=2

C_exor=$C_1$exor$C_2$, $C_3$exor$C_4$=01=1

D_exor=$D_1$exor$D_2$, $D_3$exor$D_4$=00=0

Here, 3, 2, 1, 0 in a decimal notation are respectively allocated with respect to 11, 10, 01, 00 of the 2-bit calculation values of the respective channels. However, different allocation can be performed.

The above relational expression does not depend on the logic inversion, since the same calculation result can be obtained even if the logic inversion occurs in each channel. Accordingly, the occurrence state of the bit swap can be detected by identifying the sequence of the 2-bit calculation values of the respective channels in the detection bit included in the received signal. Moreover, since the top $A_1$, $B_1$, $C_1$, and $D_1$ in the detection bit are 0000, which are the same sign, this part does not depend on the bit swap. Therefore, the occurrence state of the logic inversion can be detected by identifying the top four bits of the detection bit.

Detection of the bit swap and detection of the logic inversion using the detection bit having such a specific pattern can be performed in an arbitrary sequence. When detection of the bit swap is performed before detection of the logic inversion, and the bit swap is compensated according to the detection result, and then detection of the logic inversion is to be performed, the occurrence state of the logic inversion can be detected if the top four bits of the detection bit are known, even if not in the same sign. Therefore, the restriction involved with the detection bit pattern can be relaxed. On the contrary, when the logic inversion is detected first by using the top four bits (same sign) of the detection bit to compensate the logic inversion, and then detection of the bit swap is to be performed, the occurrence state of the bit swap can be detected by determining sequentially to which occurrence pattern of the eight occurrence patterns of the bit swap (refer to the lower part of FIG. 18) the bit string (A'B'C'D') in the received signal corresponds, without obtaining the 2-bit calculation value of the exclusive OR. Moreover, a method of sequentially determining all combinations of 8 patterns of bit swap and 16 patterns of logic inversion (64 types) is also possible, without providing the above two restrictions in the detection bit. However, when the bit swap is detected by such a method, a relatively long time is required for the detection. Therefore, reduction of the detection time by the first requirement relating to the detection bit pattern is effective.

In the explanation of the detection bit pattern, a case in which 4-bit information is transmitted within one symbol time is assumed. However, the present invention is not limited thereto, and the present invention is also applicable to a case in which information larger than 4 bits is transmitted within one symbol time, by increasing the number of detection bits according to the same idea as that when the 4-bit information is transmitted. For example, when 8-bit information is transmitted within one symbol time, 48-bit detection bits are used, and as for the first requirement, an exclusive OR of $A_5$ and $A_6$ is also used in addition to the exclusive OR of $A_1$ and $A_2$ and the exclusive OR of $A_3$ and $A_4$. Moreover for the second requirement, the top eight bits are to be the same sign. That is to say, when $2^n$-bit (n is a positive number) information is transmitted within one symbol time, the detection bit includes $2^{n+1} \times n$ bit strings. The first requirement becomes such that for the first to the n-th channels defined by the bit strings sequentially picked up in a $2^n$-bit interval from the i-th bit (i=1, 2, . . . , $2^n$) from the head, a value obtained by sequentially calculating the exclusive OR for 2-bit combinations before and after the bit string in each channel is different from each other in the respective channels. Moreover the second requirement is such that the top $2^n$ bits are the same sign.

Next a specific example of the bit swap/logic inversion control section 322 on the reception side will be explained in detail, assuming a case in which 4-bit information is transmitted within one symbol time, as in the above explanation of the detection bit.

The bit swap/logic inversion control section 322 confirms whether synchronization with the detection bit has been achieved, immediately after data reception such as immediately after startup of the system of the optical transmitter 10 or immediately after occurrence of loss of signal, and after signal synchronization is confirmed, performs detection and compensation of the bit swap and the logic inversion. Moreover when dynamic bit swap or logic inversion may occur during service operation, the bit swap/logic inversion control section 322 can monitor the occurrence state all the time to continuously compensate the bit swap or logic inversion.

Figure 2:
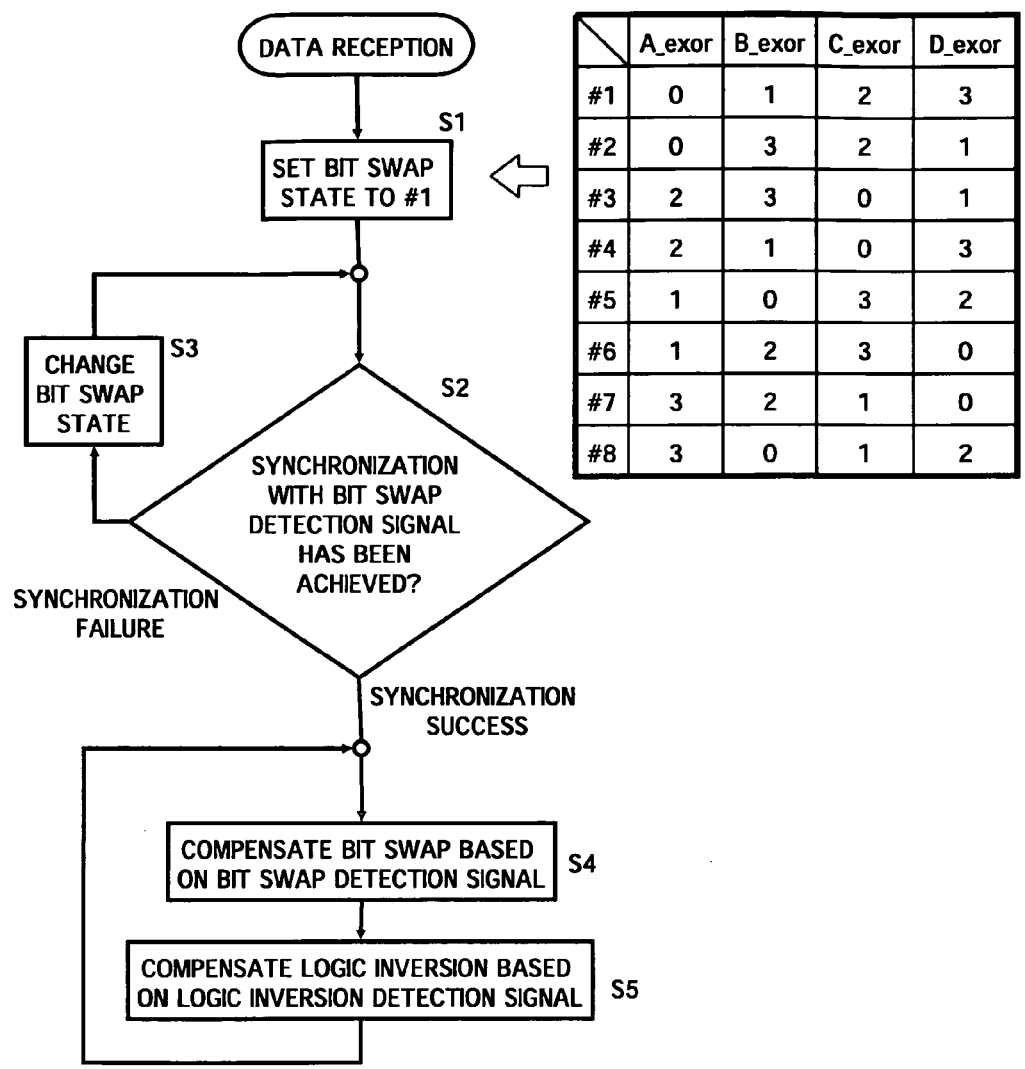
FIG. 2 is a flowchart showing a processing flow in a bit swap/logic inversion control section in the first embodiment.

FIG. 2 is an example of a flowchart showing a processing flow in the aforementioned bit swap/logic inversion control section 322. Here, a control flow is shown such that immediately after data reception, the bit swap/logic inversion control section 322 confirms the synchronization state of the signal by using a 2-bit calculation value (each value of A_exor, B_exor, C_exor, and D_exor) of the exclusive OR for the detection bits included in the received signal, performs detection and compensation of the bit swap, and then performs detection and compensation of the logic inversion. Moreover FIG. 3 is a block diagram showing a specific configuration example of the bit swap/logic inversion control section 322 corresponding to the control flow of FIG. 2.

Figure 3:
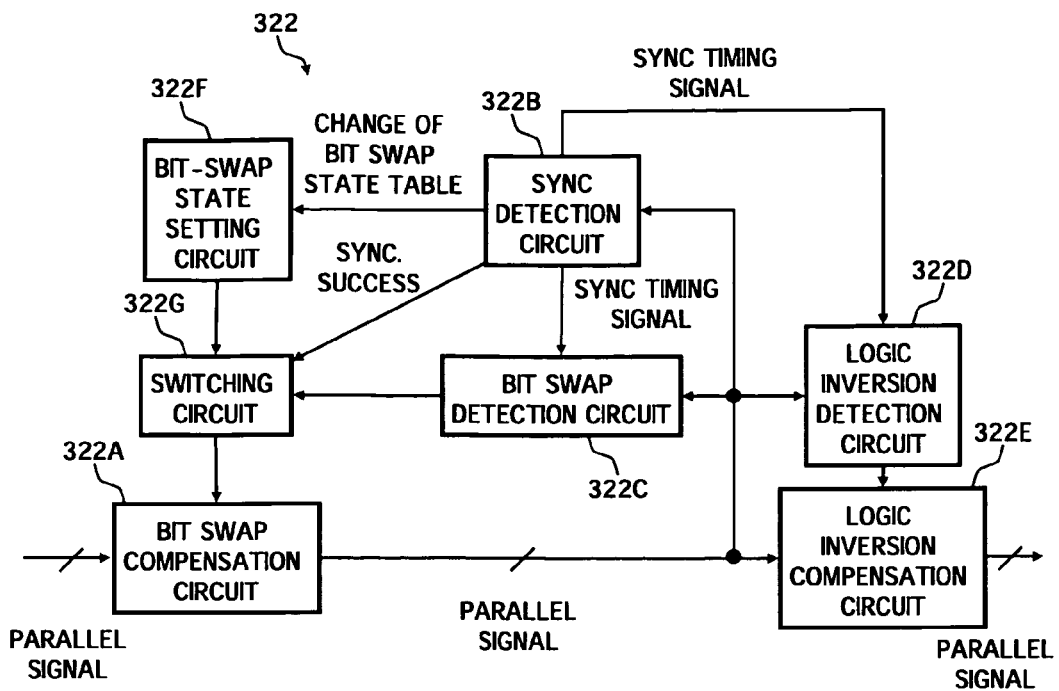
FIG. 3 is a block diagram showing a configuration example of the bit swap/logic inversion control section in the first embodiment.

In the configuration example of FIG. 3, the parallel signal from the M:N separating section 321 input to the bit swap/logic inversion control section 322 passes through a bit swap compensation circuit 322A, and is provided respectively to a synchronization detection circuit 322B, a bit swap detection circuit 322C, a logic inversion detection circuit 322D, and a logic inversion compensation circuit 322E. In the synchronization detection circuit 322B, immediately after data reception, the presence of signal synchronization is detected by using the detection bit included in the input signal. The detection of signal synchronization is performed while sequentially changing the setting of a bit-swap state setting circuit 322F as described later. When it is detected that signal synchronization has been achieved by the synchronization detection circuit 322B, a signal indicating synchronization success is output from the synchronization detection circuit 322B to a switching circuit 322G, and a synchronization timing signal is output from the synchronization detection circuit 322B to the bit swap detection circuit 322C and the logic inversion detection circuit 322D, respectively. The switching circuit 322G transmits a control signal output from the bit-swap state setting circuit 322F to the bit swap compensation circuit 322A during detection of signal synchronization, and after the signal synchronization has been achieved, the switching circuit 322G transmits a control signal output from the bit swap detection circuit 322C to the bit swap compensation circuit 322A.

Figure 4:
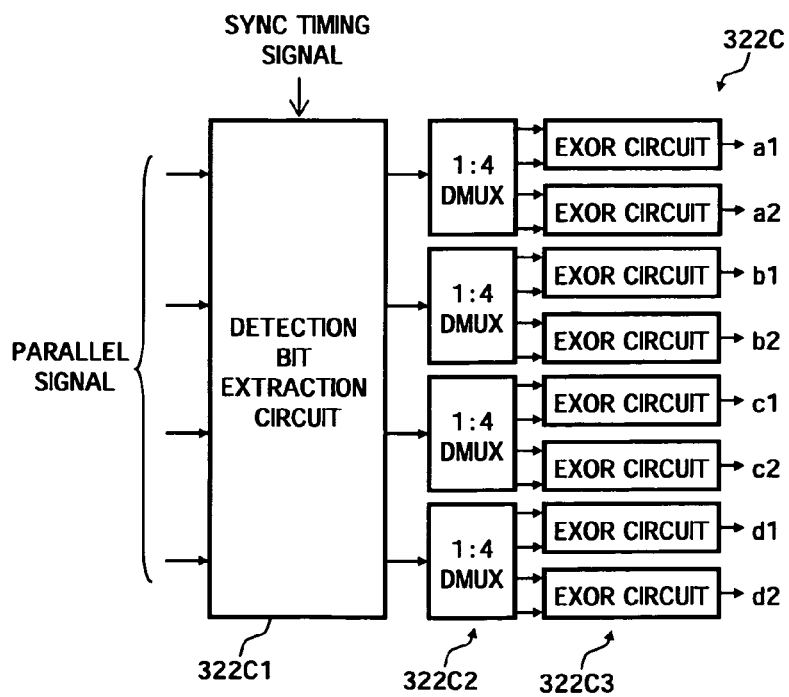
FIG. 4 is a circuit diagram showing a specific example of a bit swap detection circuit in FIG. 3.

The bit swap detection circuit 322C, for example as shown in FIG. 4, comprises a detection bit extraction circuit 322C1 which extracts a detection bit from the parallel signal according to the synchronization timing signal, and four 1:4 demultiplexers 322C2 and eight EXOR circuits 322C3 for calculating a 2-bit calculation value of the exclusive OR for the detection bit extracted by the detection bit extraction circuit 322C1. Here, calculation values a1, a2 output from the first and second EXOR circuits from the top in FIG. 4 correspond to A_exor, calculation values b1, b2 output from the third and fourth EXOR circuits correspond to B_exor, calculation values c1, c2 output from the fifth and sixth EXOR circuits correspond to C_exor, and calculation values d1, d2 output from the seventh and eighth EXOR circuits correspond to D_exor.

Figure 5:
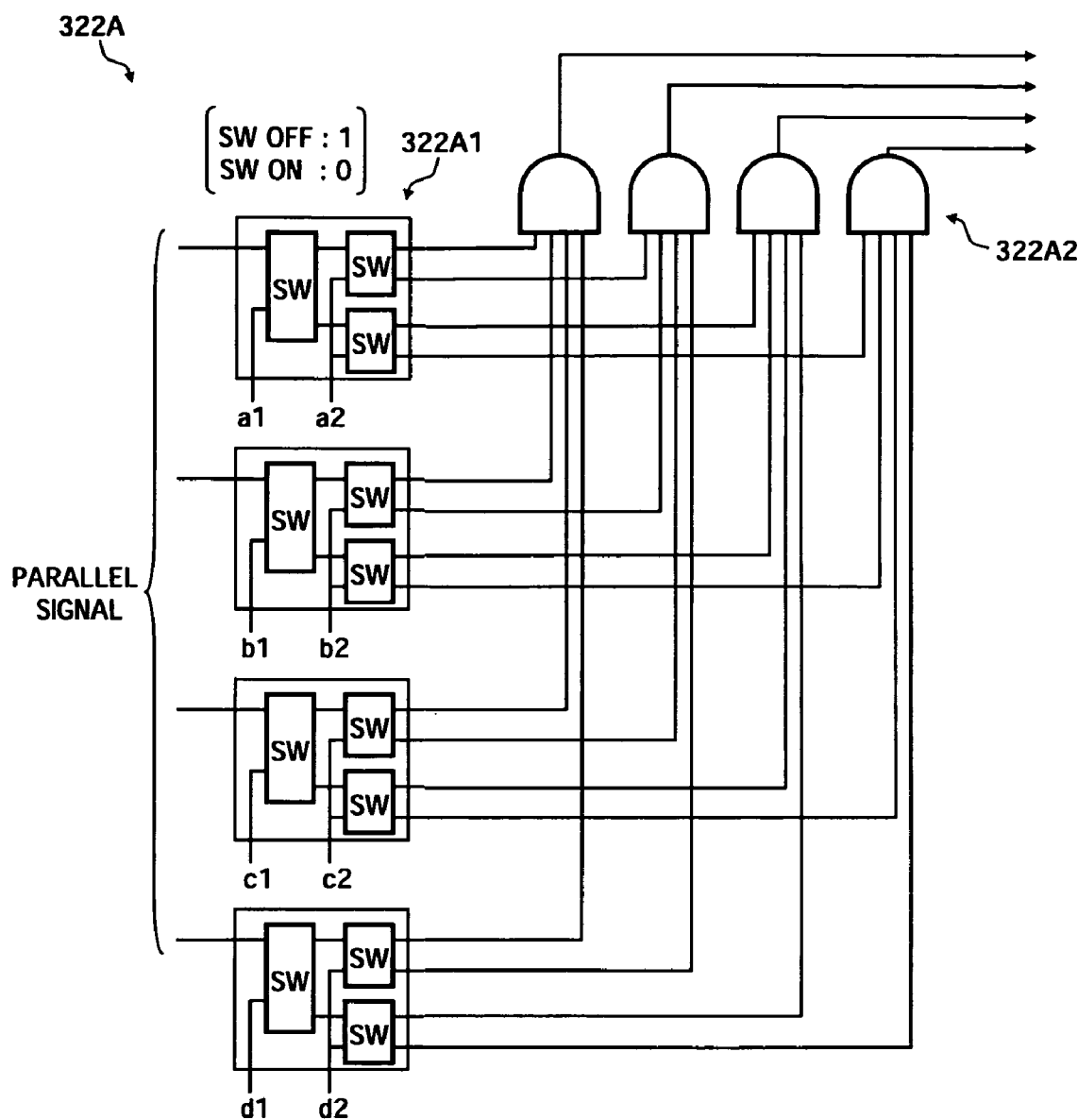
FIG. 5 is a circuit diagram showing a specific example of a bit swap compensation circuit in FIG. 3.

The bit swap compensation circuit 322A, for example as shown in FIG. 5, comprises four sets of switching sections 322A1, respectively corresponding to A_exor to D_exor, and four AND circuits 322A2 which calculate a logical product of one output of four outputs of respective switching sections 322A1. Each switching section 322A1 is formed by combining three switches.

Figure 6:
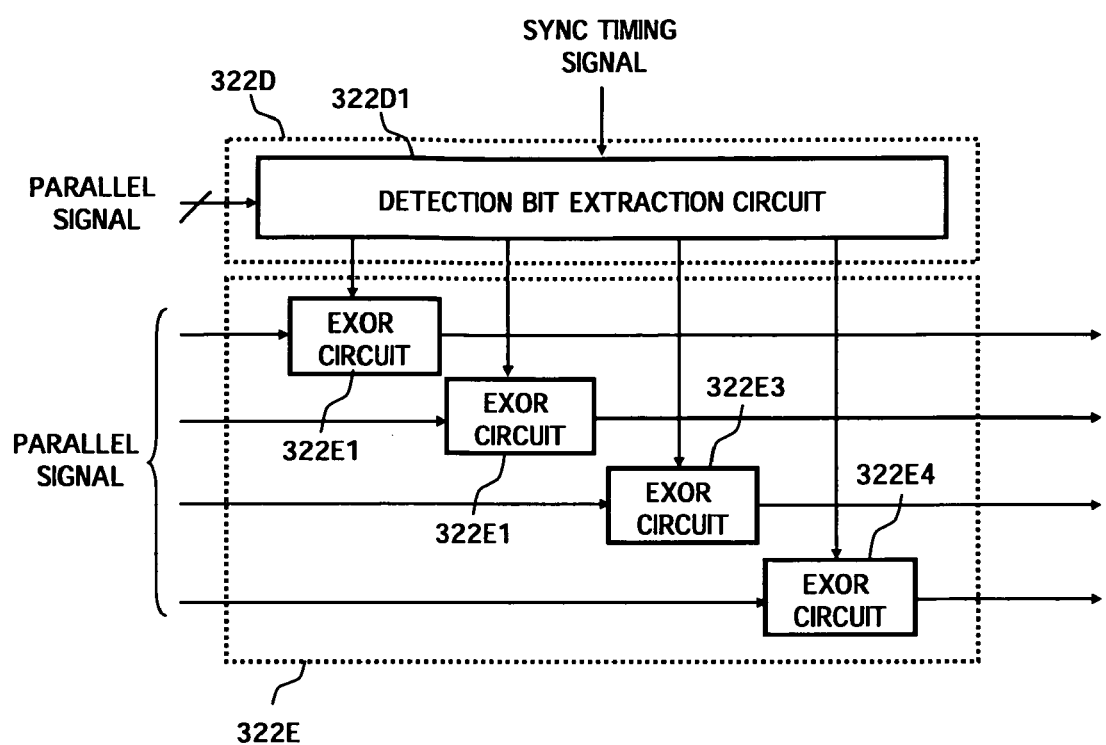
FIG. 6 is a circuit diagram showing a specific example of a logic inversion detection circuit and a logic inversion compensation circuit in FIG. 3.

The logic inversion detection circuit 322D, for example as shown in the upper part of FIG. 6, comprises a detection bit extraction circuit 322D1 which extracts the top four bits of the detection bit from the parallel signal according to the synchronization timing signal. Moreover the logic inversion compensation circuit 322E, for example as shown in the lower part of FIG. 6, comprises four EXOR circuits 322E1 to 322E4 which calculate the exclusive OR of each bit extracted by the detection bit extraction circuit 322D1 and the parallel signal.

An operation of the bit swap/logic inversion control section 322 having the above-described configuration will be explained with reference to the flowchart in FIG. 2. At first, in step 1 (shown by S1 in FIG. 2 and similarly hereunder), immediately after data reception, one of the eight patterns #1 to #8 (here, #1) in a bit swap state table shown on the right side of FIG. 2, is set to an initial state of the bit-swap state setting circuit 322F. Accordingly, a control signal corresponding to pattern #1 is provided to the bit swap compensation circuit 322A via the switching circuit 322G. In the bit swap state table, bit swap patterns which can occur are represented by combinations of respective values of A_exor to D_exor (any one value of 0, 1, 2, and 3 expressed by the decimal notation).

In step 2, in the synchronization detection circuit 322B, A_exor to D_exor are calculated for the parallel signal input to the synchronization detection circuit 322B via the bit swap compensation circuit 322A, and a signal synchronization state is detected by using the signal. When it is detected that signal synchronization has not been achieved due to disagreement between a calculation result and a setting pattern in step 1, control proceeds to step 3, where the setting pattern of the bit-swap state setting circuit 322F is changed. Control then returns to step 2, and the above process is repeated. When it is detected that signal synchronization has been achieved based on agreement between the calculation result and the setting pattern, the switching circuit 322G is switched to the bit swap detection circuit 322C side, and control proceeds to step 4, where detection and compensation of the bit swap are performed.

When signal synchronization is to be achieved by using the detection bit, if a synchronization error may occur due to a short bit length of the detection bit, a necessary bit string can be added to the detection bit to prevent the synchronization error.

In step 4, at first in the bit swap detection circuit 322C, A_exor to D_exor are calculated for the detection bit included in the input parallel signal, and the calculation result is output to the bit swap compensation circuit 322A via the switching circuit 322G. Then in the bit swap compensation circuit 322A, an output signal from the bit swap detection circuit 322C is provided to the corresponding switching section 322A1, and a logical product of the outputs of the respective switching sections 322A1 is calculated in the AND circuit 322A2, to thereby compensate the bit swap.

When compensation of the bit swap is complete, control proceeds to step 5, where detection and compensation of the logic inversion are performed. Here, the top four bits of the detection bit included in the parallel signal, in which the bit swap has been compensated, are extracted by the logic inversion detection circuit 322D, and respective bit values are respectively provided to each of the EXOR circuits 322E1 to 322E4 in the logic inversion compensation circuit 322E, to thereby compensate the logic inversion. Then during the system operation, the processes in step 4 and step 5 are repeated with a required cycle, to thereby detect and compensate dynamic bit swap and logic inversion continuously.

As described above, according to the optical transmission system in the first embodiment, even for the system that transmits information of 4 bits or more within one symbol time by combining the multivalue modulation format and the polarization multiplexing system, which has been difficult to handle in the conventional technique, control (detection and compensation) of the bit swap and logic inversion can be performed reliably and at a high speed, by adding the detection bit having a specific pattern set according to the number of transmission bits to the transmission signal, and using the detection bit included in the received signal.

In the first embodiment, in the control flow of the bit swap/logic inversion control section 322 shown in FIG. 2, after the bit swap control has been performed, the logic inversion control is performed. Conversely, after the logic inversion control has been performed, the bit swap control can be performed. Moreover, in order to correspond to the dynamic bit swap and logic inversion, respective controls of the bit swap and the logic inversion are repetitively performed during the operation. However, for example when the dynamic bit swap and logic inversion do not occur as in a system in which differential reception for the same channel is applied, detection and compensation of the bit swap and the logic inversion need to be performed only once at the time of startup or the like.

Moreover as an application example when the dynamic bit swap and logic inversion do not occur, in a system in which a transmission signal is framed according to an Optical Transport Network (OTN) frame format, a header of an OTN frame can be used as the detection bit, to thereby simplify the configuration of the optical transmitter and the optical receiver. That is to say, in the OTN frame, a Frame Alignment Signal (FAS) byte is specified as a frame synchronization bit, and when OA1 (11110110) and OA2 (00101000) can be received as OA1, OA1, OA1, OA2, OA2, and OA2, a state in which frame synchronization has been achieved is determined. The bit pattern (1111011000101000) of the OA1 and OA2 signals satisfies the aforementioned requirements for the detection bit for the bit swap and the logic inversion in the present invention. Therefore, when 4-bit information is transmitted within one symbol time, the frame synchronization bit can be used as the detection bit. Accordingly, the function corresponding to the detection bit imparting section 115 in the transmission signal processing circuit 11 shown in FIG. 1 can be realized by the frame encoding section 112, and hence, the detection bit imparting section 115 can be omitted. Moreover, since all of the 16 patterns of the logic inversion and the 8 patterns of the bit swap can be expressed by the OA1 and OA2 signals, logic inversion and bit swap can be detected according to whether frame synchronization is successful. Accordingly, the configuration of the bit swap/logic inversion control section 322 in the received signal processing circuit 32 can be simplified.

Next is a description of a second embodiment of the present invention.

Figure 7:
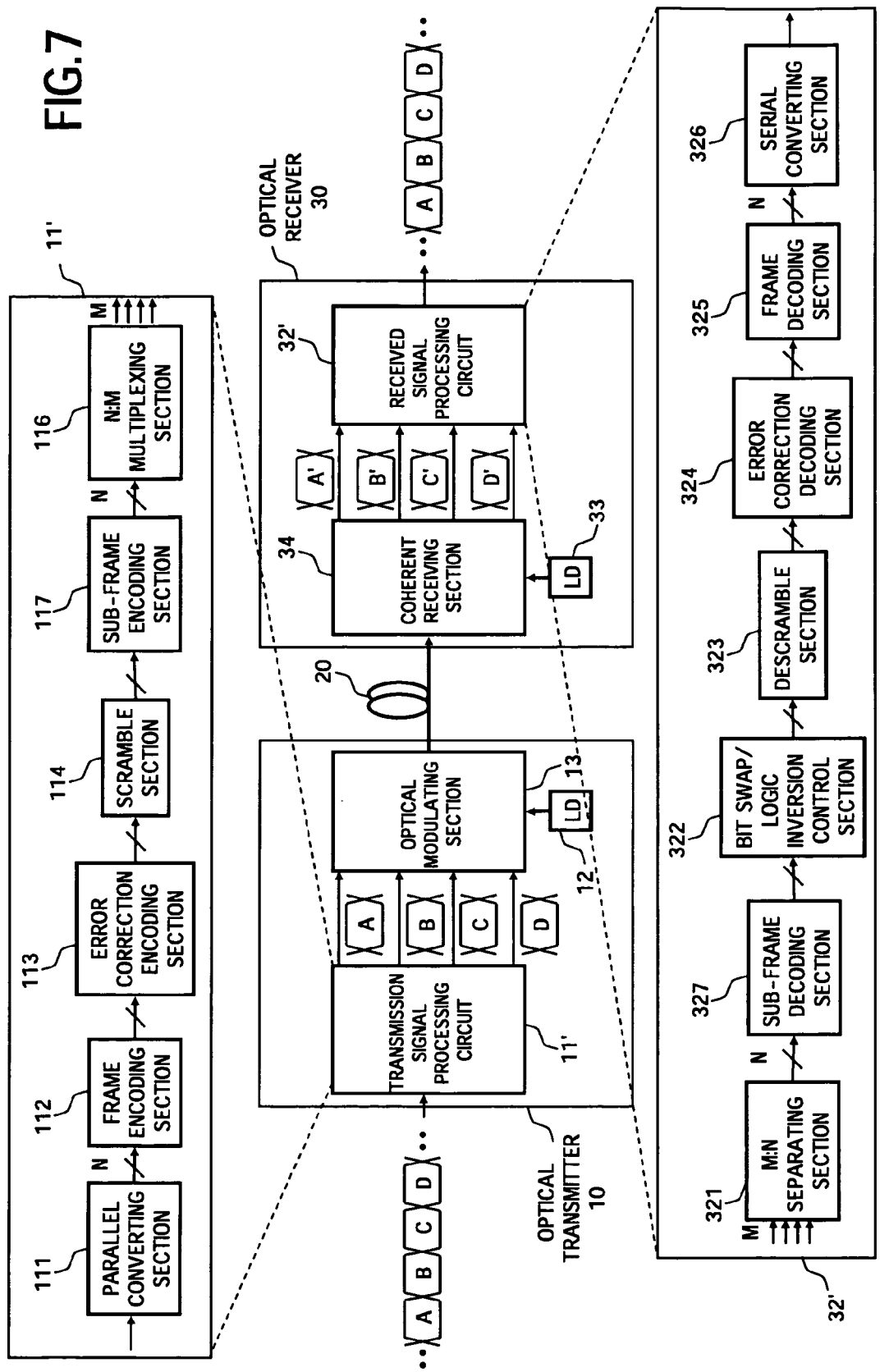
FIG. 7 is a block diagram showing the configuration of an optical transmission system according to a second embodiment of the present invention.

FIG. 7 is a block diagram showing the configuration of the optical transmission system according to the second embodiment of the present invention.

In FIG. 7, in the optical transmission system, when the coherent receiving system is applied to the optical receiver 30, in the aforementioned configuration of the first embodiment (FIG. 1), detection and compensation of the dynamic bit swap and logic inversion occurring due to phase fluctuation or the like in the local oscillator light used for coherent reception can be performed more reliably, by defining a sub-frame shorter than an error correction frame for a transmission signal, and arranging the same detection bit as in the first embodiment at the head of the sub-frame.

Specifically, the point where the configuration of this optical transmission system is different from the case of the first embodiment is that a sub-frame encoding section 117 is provided, instead of the detection bit imparting section 115 used in the first embodiment, in a transmission signal processing circuit 11' in the optical transmitter 10. Moreover, for an optical receiver 30', the point where this is different from the first embodiment is that a local oscillator light source 33 and a coherent receiving section 34 corresponding to the light receiving section 31 in the first embodiment are provided, and a sub-frame decoding section 327 is provided between the M:N separating section 321 and the bit swap/logic inversion control section 322, as the configuration of a received signal processing circuit 32'.

Figure 8:
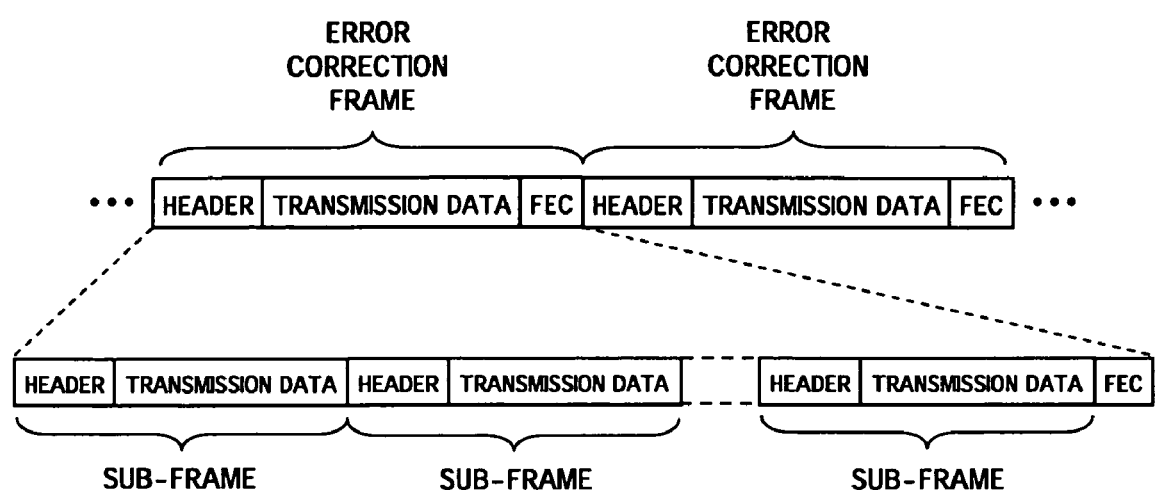
FIG. 8 is a diagram showing one example of a transmission data structure in the second embodiment.

The aforementioned sub-frame encoding section 117 respectively sets a sub-frame with respect to the parallel signal output from the scramble section 114. The sub-frame has a frame length shorter than the frame length of the error correction frame including a header, transmission data, and an error correction code (FEC), for example, as shown in a transmission data structure shown in FIG. 8, and a plurality of sub-frames is set in one error correction frame. Each sub-frame is formed of a header including a detection bit for detecting bit swap and logic inversion, and the transmission data. The frame length of each sub-frame can be appropriately set according to the occurrence state of dynamic bit swap and logic inversion due to the phase fluctuation or the like in the local oscillator light.

Figure 17:
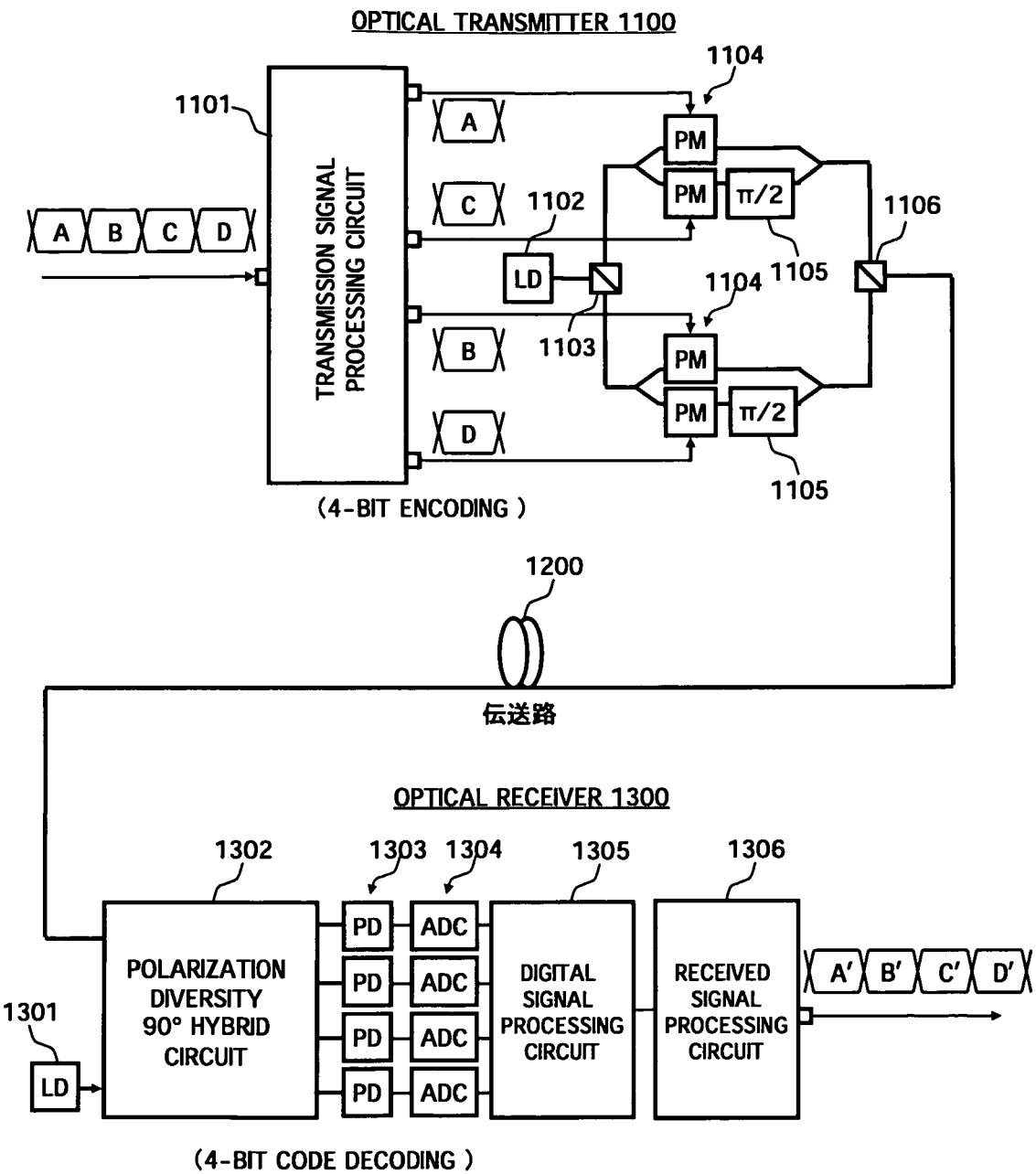
FIG. 17 is a block diagram showing a configuration example of a conventional optical transmission system.
Figure 19:
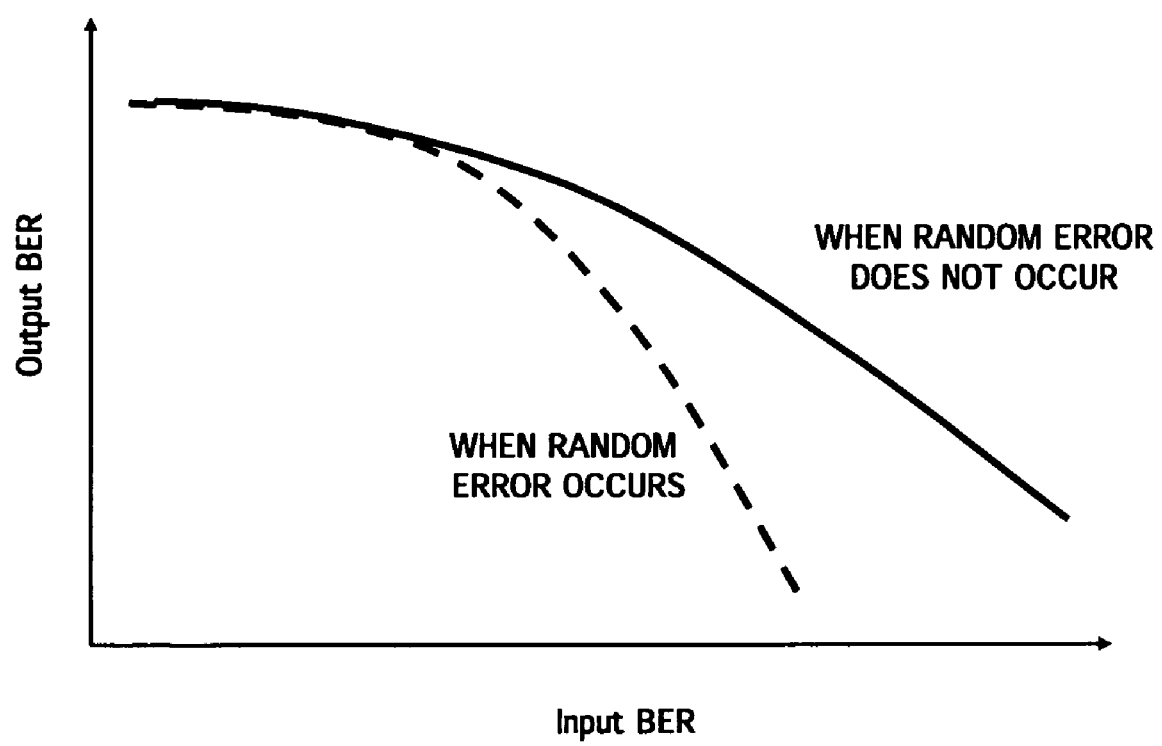
FIG. 19 is a diagram for explaining a deterioration state of error correction performance caused by characteristic variations between channels in the conventional optical transmission system.

When it is assumed that an optical signal, in which, for example, QPSK and polarization multiplexing are combined, is received digitally and coherently, the same configuration as that of the local oscillator light source 1301, the polarization diversity 90° hybrid circuit 1302, the photodetector 1303, the AD converter 1304, and the digital signal processing circuit 1305 in the optical receiver 1300 shown in FIG. 17 is applied to the local oscillator light source 33 and the coherent receiving section 34. However, the configuration of the coherent receiving section 34 is not limited to the above specific example, and a known configuration can be applied.

The sub-frame decoding section 327 decodes the parallel signal output from the M:N separating section 321, and outputs the detection bit included in the header of the sub-frame to the bit swap/logic inversion control section 322 in a state with the detection bit being identifiable. The bit swap/logic inversion control section 322 uses the detection bit corresponding to each sub-frame, to perform detection and compensation of the bit swap and the logic inversion according to the same method as in the first embodiment.

In the optical transmission system having the above configuration, since control of the bit swap and the logic inversion is performed in a unit of a sub-frame shorter than the error correction frame, then even if bit swap or logic inversion occurs in the middle of the error correction frame, the occurrence can be reliably detected and compensated. The bit swap or logic inversion occurring in the middle of the sub-frame can be compensated by an error correction process using the error correction code. Therefore according to the optical transmission system, the dynamic bit swap and logic inversion caused by the phase fluctuation or the like in the local oscillator light can be compensated highly accurately.

Next is a description of a third embodiment of the present invention.

Figure 9:
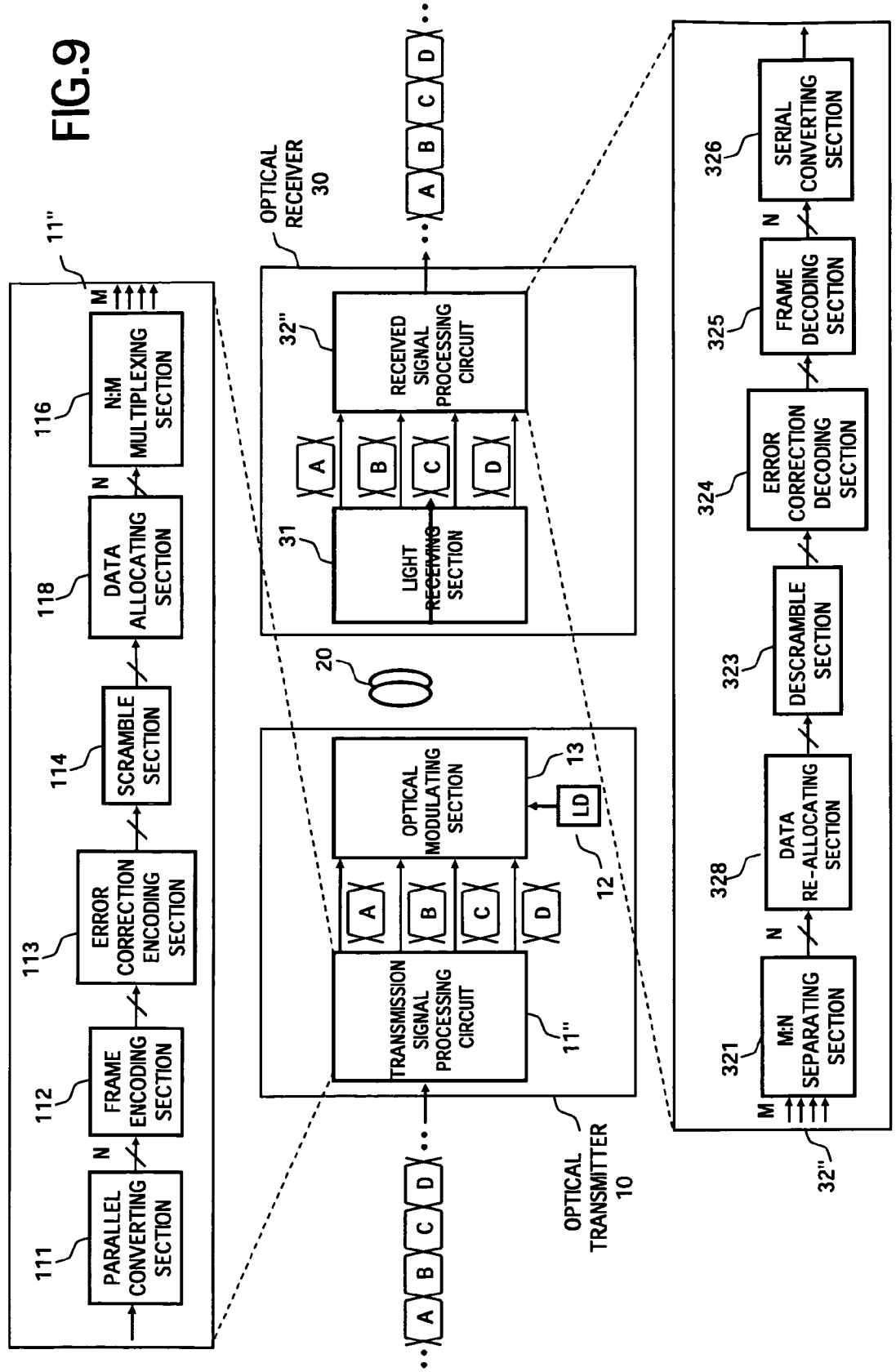
FIG. 9 is a block diagram showing the configuration of an optical transmission system according to a third embodiment of the present invention.

FIG. 9 is a block diagram showing the configuration of the optical transmission system according to the third embodiment of the present invention.

In the optical transmission system according to the third embodiment, for example, for a system that can transmit 2 bits (4-valued) or more information within one symbol time by using the polarization multiplexing system or the multi-value modulation format, characteristic variations between transmission channels caused by the PDL or the like in the transmission line or the optical device are taken into consideration, and deterioration of the error correction performance at the time of reception is suppressed by allocating transmission data to each transmission channel so that the variations are averaged over all the transmission channels. In the configuration example of FIG. 9, an optical transmitter 10 comprising a transmission signal processing circuit 11", a light source (LD) 12, and an optical modulating section 13 is connected to an optical receiver 30 comprising a light receiving section 31 and a received signal processing circuit 32", via a transmission line 20. The transmission signal processing circuit 11" has a function of allocating the transmission data to average the characteristic variations between the channels. Moreover the received signal processing circuit 32" has a function of re-allocating the received data corresponding to the allocation on the transmission side. The configuration of other parts excluding the transmission signal processing circuit 11" and the received signal processing circuit 32" is basically the same as that of the aforementioned first embodiment, and hence explanation thereof is omitted here.

The transmission signal processing circuit 11" has a configuration as shown enlarged in the upper part of FIG. 9. The point that is different from the transmission signal processing circuit 11 in the first embodiment is that a data allocating section 118 is provided instead of the detection bit imparting section 115. The data allocating section 118 changes allocation of data (bits) to respective polarization channels so that each bit in the channels (for example, A and C) to be transmitted in X polarization, and each bit in the channels (for example, B and D) to be transmitted in Y polarization, in a normal allocation are alternated at a required proportion.

Figure 10:
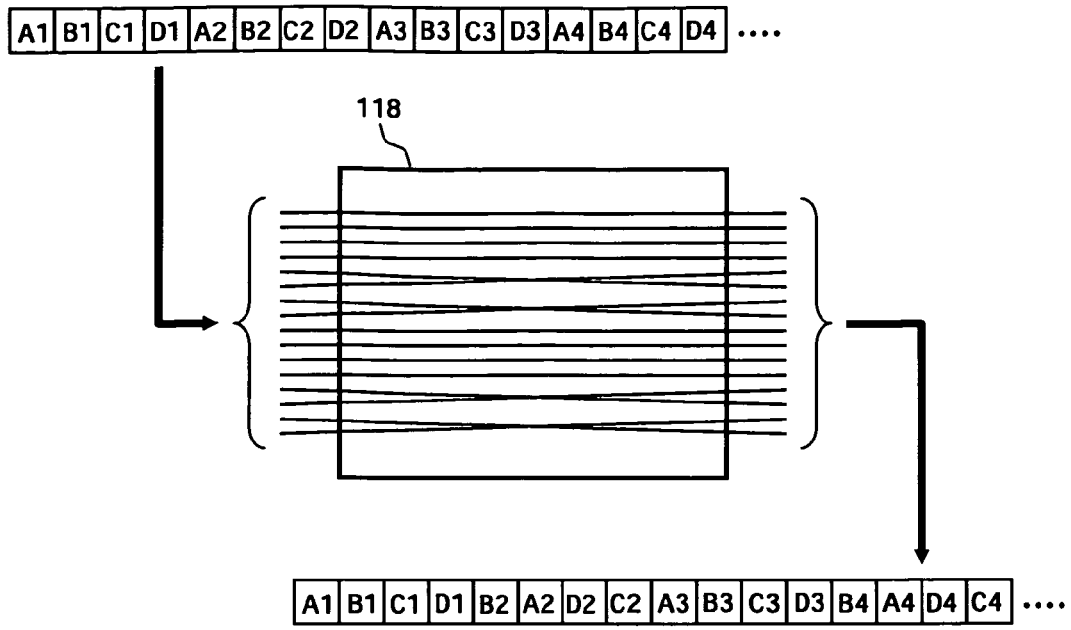
FIG. 10 is a diagram showing a configuration example of a data allocating section in the third embodiment.
Figure 11:
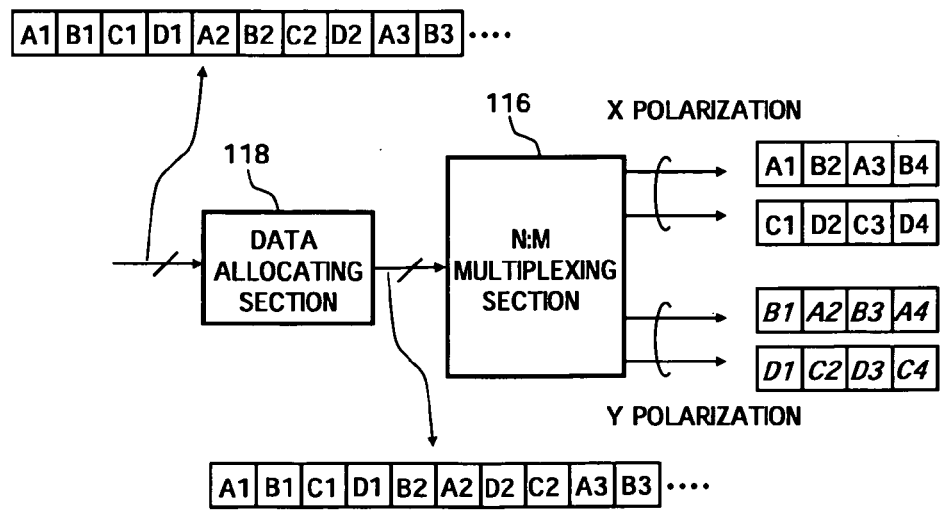
FIG. 11 is a diagram for explaining an operation of a transmission signal processing circuit in the third embodiment.

FIG. 10 is a diagram showing a specific configuration example of the data allocating section 118. This circuit is configured by alternating odd numbers (for example, 5th, 7th, 13th, and 15th) and even numbers (for example, 6th, 8th, 14th, and 16th) with respect to a part of a parallel signal wiring through which the N-bit parallel signal (for example, N=16 bits) output from the scramble section 114 propagates. In this circuit, for serialized input data shown in the upper left portion of FIG. 10, the orders of A2 and B2, C2 and D2, A4 and B4, and C4 and D4 are respectively alternated, and output data as shown in the lower right portion of FIG. 10 is generated. Accordingly, as shown on the right side of FIG. 11, respective bits A1 to A4 in Channel A, respective bits B1 to B4 in Channel B, respective bits C1 to C4 in Channel C, and respective bits D1 to D4 in Channel D coexist in the respective X polarization channel and Y polarization channel. The configuration of the data allocating unit 118 is not limited to the above example.

Moreover the received signal processing circuit 32" has a configuration as shown enlarged in the lower part of FIG. 9. The point that is different from the received signal processing circuit 32 in the first embodiment is that a data re-allocating section 328 is provided instead of the bit swap/logic inversion control section 322. The data re-allocating section 328 performs a process to return the order of respective bits alternated on the transmission side to the original order for the parallel signal output from the M:N separating section 321. For the specific circuit configuration of the data re-allocating section 328, a circuit configuration basically the same as the aforementioned circuit configuration shown in FIG. 10 can be applied.

Figure 12:
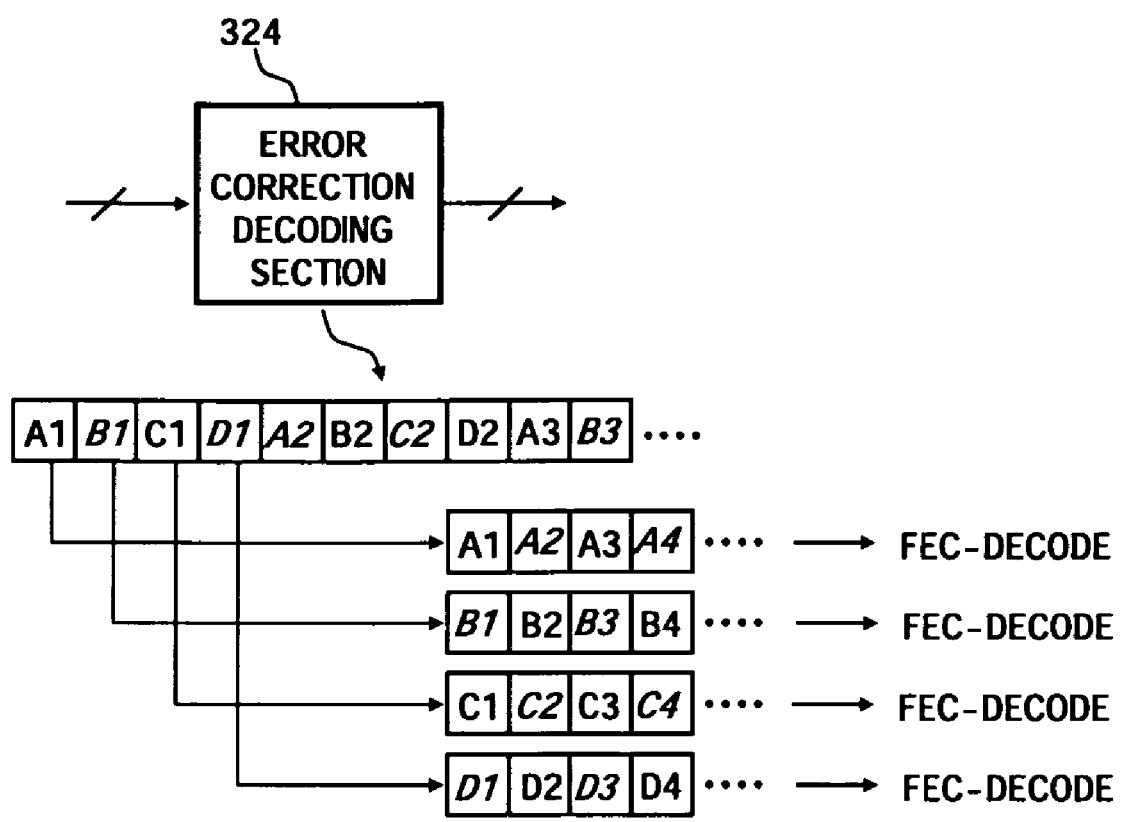
FIG. 12 is a diagram for explaining an operation of an error correction decoding section in the third embodiment.

In the optical transmission system having the above configuration, when the error correction process (FEC decoding) of the received signal is performed by the error decoding section 324 in the received signal processing circuit 32", as shown in FIG. 12, A1 and A3 transmitted in X polarization and A2 and A4 transmitted in Y polarization are FEC-decoded as the channel A, and B2 and B4 transmitted in X polarization and B1 and B3 transmitted in Y polarization are FEC-decoded as the channel B. Moreover, in the same manner, C1 and C3 transmitted in X polarization and C2 and C4 transmitted in Y polarization are FEC-decoded as the channel C, and D2 and D4 transmitted in X polarization and D1 and D3 transmitted in Y polarization are FEC-decoded as the channel D. Accordingly, even if the characteristic variations occur between the X polarization channel and the Y polarization channel due to the PDL or the like in the transmission line 20, the channels A to D FEC-decoded on the reception side respectively have the random error. Therefore, deterioration of the error correction performance due to the characteristic variations between the polarization channels can be suppressed.

In the third embodiment, as a specific example, a case in which deterioration of the error correction performance is suppressed by performing allocation of the transmission data to respective channels so that the characteristic variations between the X polarization channel and the Y polarization channel are averaged has been explained, assuming a case in which the polarization multiplexing system is applied. However, such an idea is also effective when, for example, the multivalue modulation format is applied and characteristic variations occur between different phase channels. In this case, allocation of the transmission data to the respective phase channels can be optimized so that the characteristic variations are averaged over all the phase channels.

Next is a description of a fourth embodiment of the present invention.

Figure 13:
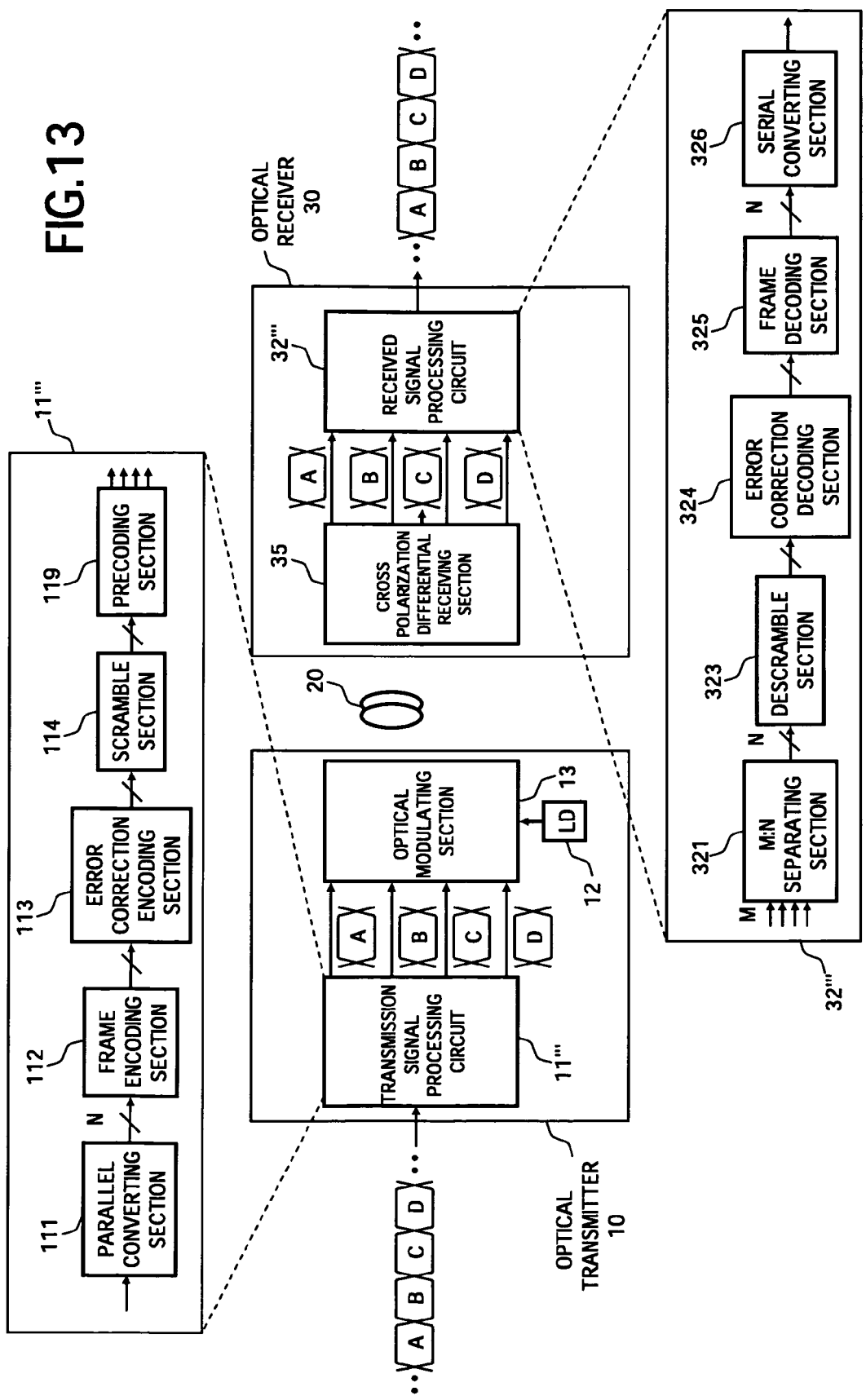
FIG. 13 is a block diagram showing the configuration of an optical transmission system according to a fourth embodiment of the present invention.

FIG. 13 is a block diagram showing the configuration of the optical transmission system according to the fourth embodiment of the present invention.

In the optical transmission system according to the fourth embodiment, for example, for a system that can transmit 2 bits (4-valued) or more information within one symbol time by using at least the polarization multiplexing system, characteristic variations between different polarization channels can be reduced, and deterioration of the error correction performance at the time of reception can be suppressed, by performing differential reception between the X polarization channel and the Y polarization channel. In the configuration example shown in FIG. 13, an optical transmitter 10 comprising a transmission signal processing circuit 11''', a light source (LD) 12, and an optical modulating section 13 is connected to an optical receiver 30 comprising a cross polarization differential receiving section 35 and a received signal processing circuit 32''', via a transmission line 20. The transmission signal processing circuit 11''' has a precoding function of the transmission signal for performing differential reception between the X polarization channel and the Y polarization channel, and a function of converting the optical signal received by the cross polarization differential receiving section 35 into an electric signal to perform differential reception between signals respectively corresponding to the X polarization and Y polarization.

The same configuration as that used in the aforementioned conventional system shown in FIG. 17 can be applied to the received signal processing circuit 32'''. Here, as shown enlarged in the lower part of FIG. 13, the configuration including the M:N separating section 321, the descramble section 323, the error correction decoding section 324, the frame decoding section 325, and the serial converting section 326 is used. Moreover the configuration of other parts excluding the transmission signal processing circuit 11''', the cross polarization differential receiving section 35, and the received signal processing circuit 32''' is basically the same as that in the first embodiment, and hence explanation thereof is omitted here.

Figure 14:
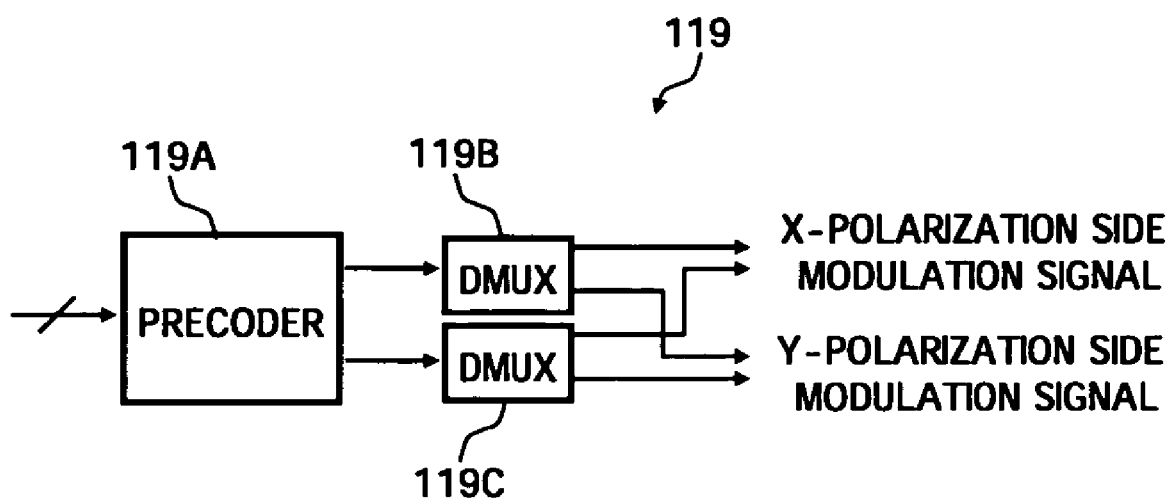
FIG. 14 is a diagram showing a configuration example of a precoding section in the fourth embodiment.

The transmission signal processing circuit 11''' has the configuration as shown enlarged in the upper part of FIG. 13. The point that is different from the transmission signal processing circuit 11 in the first embodiment is that a preceding section 119 is provided instead of the detection bit imparting section 115 and the N:M multiplexing section 116. For example, as shown in FIG. 14, the precoding section 119 generates an X-polarization side modulation signal and a Y-polarization side modulation signal by precoding an output signal from the scramble section 114 by a precoder 119A, then branching two signals output from the precoder 119A into two by demultiplexers 119B and 119C, respectively, and mutually combining the two outputs from the respective demultiplexers 119B and 119C.

Figure 15:
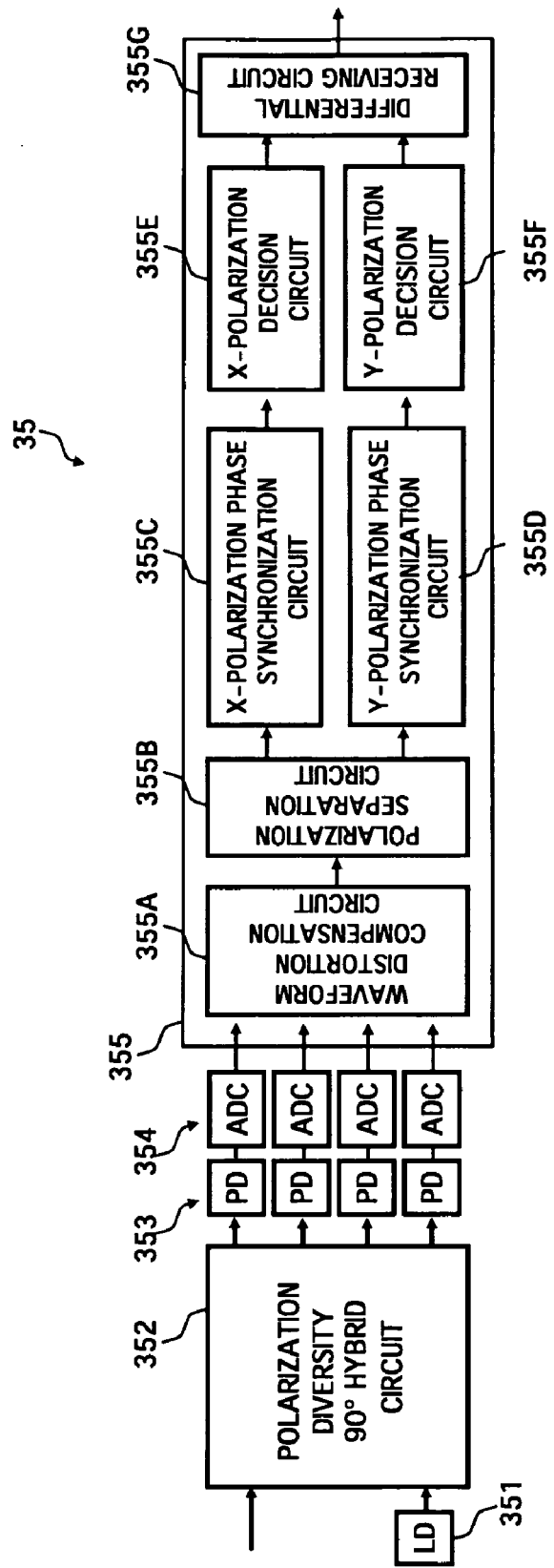
FIG. 15 is a diagram showing a configuration example of a cross polarization difference receiving section in the fourth embodiment.

The cross polarization differential receiving section 35, for example as shown in FIG. 15, comprises a local oscillator light source 351, a polarization diversity 900 hybrid circuit 352, photo detectors 353, AD converters 354, and a digital signal processing circuit 355. Furthermore the digital signal processing circuit 355 has, as a functional block, a waveform distortion compensation circuit 355A, a polarization separation circuit 355B, an X-polarization phase synchronization circuit 355C, a Y-polarization phase synchronization circuit 355D, an X-polarization decision circuit 355E, a Y-polarization decision circuit 355F, and a differential receiving circuit 355G. However, the configuration of the cross polarization differential receiving section 35 is not limited to the above example.

In the optical transmission system having the above configuration, since the differential reception is performed between the X polarization channel and the Y polarization channel, the influence of the characteristic variations between the different polarization channels is substantially eliminated. Accordingly, deterioration of the error correction performance due to a decrease in the random nature of the error in the received signal as seen in the conventional system can be suppressed.

In the fourth embodiment, an example in which differential reception between the X polarization and the Y polarization is applied to the optical receiver of the digital coherent receiving system is shown. However, the same operational effect can be obtained also when differential reception between the X polarization and the Y polarization is applied to the optical receiver of the direct detection system.

Next is a description of a fifth embodiment of the present invention.

Figure 16:
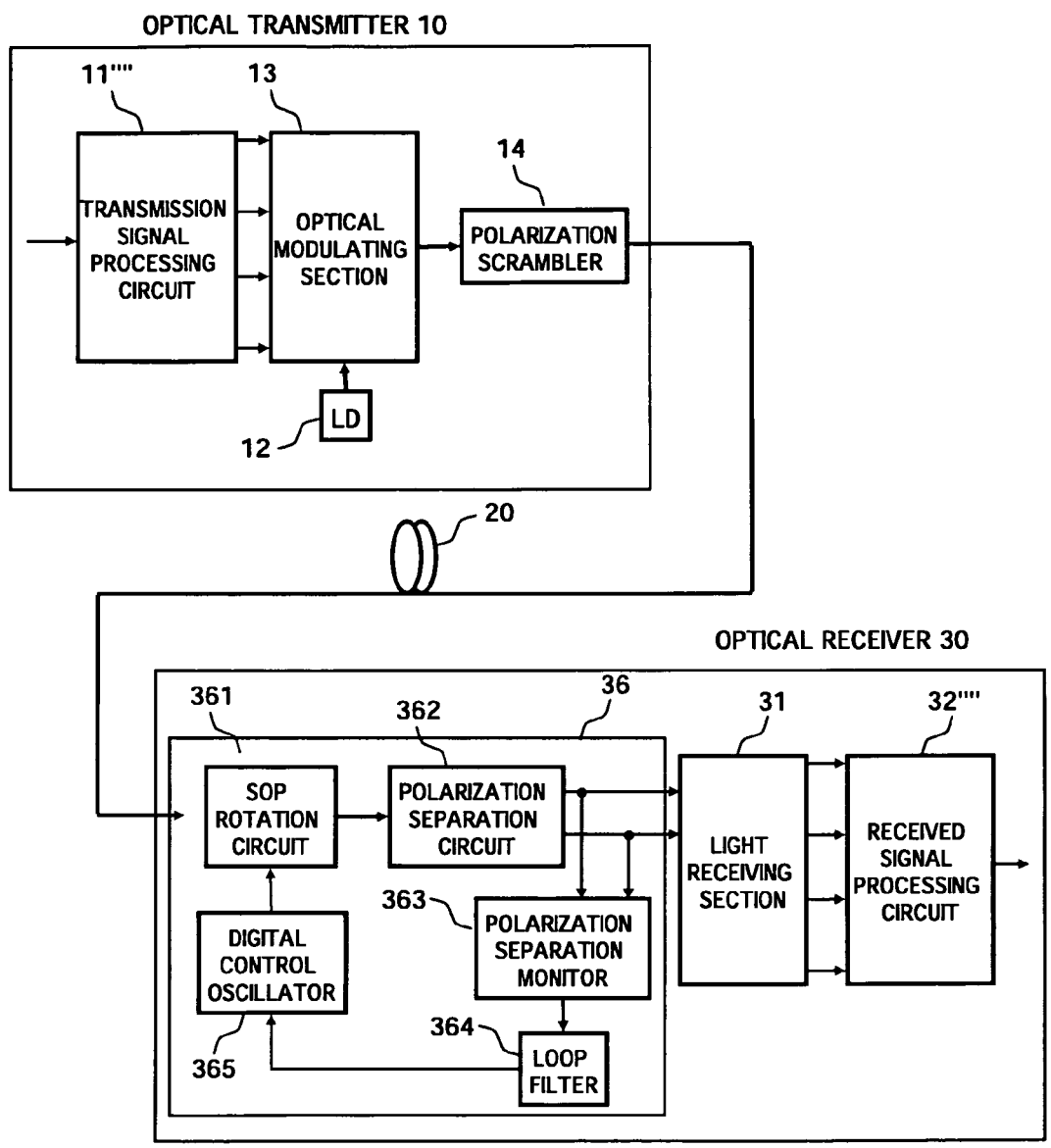
FIG. 16 is a block diagram showing the configuration of an optical transmission system according to a fifth embodiment of the present invention.

FIG. 16 is a block diagram showing the configuration of the optical transmission system according to the fifth embodiment of the present invention.

In the optical transmission system according to the fifth embodiment, for example, for a system that can transmit 2 bits (4-valued) or more information within one symbol time by using at least the polarization multiplexing system, on the transmission side, after a polarized state of a polarization multiplexed optical signal is scrambled, the signal is transmitted to the transmission line, while on the reception side, polarization separation is performed while following polarization rotation of the optical signal, to execute a required reception process, to thereby reduce characteristic variations between different polarization channels, and suppress deterioration of the error correction performance at the time of reception.

Specifically, in the configuration example in FIG. 16, an optical transmitter 10 comprising a transmission signal processing circuit 11"", a light source (LD) 12, an optical modulating section 13, and a polarization scrambler 14 is connected to an optical receiver 30 comprising a polarization separating section 36, a light receiving section 31, and a received signal processing circuit 32"", via a transmission line 20. The transmission signal processing circuit 11"" and the received signal processing circuit 32"" have the same configuration as the circuits used in the conventional system shown in FIG. 17. Moreover, the configuration of the light source 12 and the optical modulating section 13 on the transmission side, and the configuration of the light receiving section 31 are basically the same as those in the first embodiment, and hence explanation thereof is omitted here.

The polarization scrambler 14 is arranged in a subsequent stage of the polarization beam combiner in the optical modulating section 13 (refer to FIG. 17), to rotate a SOP (state of polarization) of the polarization multiplexed optical signal during a time shorter than the time corresponding to a frame length of the error correction frame, and output the optical signal to the transmission line 20. For the polarization scrambler 14, a configuration such that the SOP of the optical signal is rotated by 360° can be used. However, for example, a simple configuration in which the SOP is simply turned (reciprocated) between 0° and 90° can be used. Such a polarization scrambler 14 can be realized relatively easily by using, for example, a ½ wave plate, a variable Faraday rotator, an electrooptic device, an acousto-optic device, or a PLZT element.

The polarization separating section 36 comprises, for example, an SOP rotation circuit 361, a polarization separation circuit 362, a polarization separation monitor 363, a loop filter 364, and a digital control oscillator 365. The SOP rotation circuit 361 is a circuit to which an optical signal polarization-scrambled on the transmission side is input via the transmission line 20, wherein the SOP of the optical signal is rotated according to a control signal output from the digital control oscillator 365. The polarization separation circuit 362 is a circuit that separates the optical signal, whose SOP is rotated by the SOP rotation circuit 361, into an X polarization component and a Y polarization component. The respective X polarization optical signal and Y polarization optical signal separated by the polarization separation circuit 362 are provided to the light receiving section 31 in the subsequent stage, and a part of the respective optical signals is branched as a monitor light and transmitted to the polarization separation monitor 363.

The polarization separation monitor 363 is a circuit that monitors whether the received optical signal is correctly polarization-separated, using the X polarization monitor light and the Y polarization monitor light. The polarization separation monitor 363 monitors whether polarization separation of the received light is performed following the polarization scramble on the transmission side, by for example taking correlation of power between X polarization and Y polarization or superimposing beforehand a pilot signal on either the X polarization or the Y polarization on the transmission side, to detect the pilot signal included in the X polarization monitor light and the Y polarization monitor light. The monitoring result is here output to the loop filter 364 as a monitoring signal indicating a deviation amount of polarization separation.

The loop filter 364 cuts AC components in the monitoring signal output from the polarization separation monitor 363, thereby enabling to track the rotation of the SOP in the SOP rotation circuit 361. The digital control oscillator 365 generates a control signal indicating a rotation amount of the SOP following the polarization scramble on the transmission side, according to the output signal from the loop filter 364, and outputs the control signal to the SOP rotation circuit 361.

Here an example in which the digital control oscillator is used is shown. However, when the output signal from the loop filter is a signal indicating an averaged deviation amount of polarization separation, an integration circuit can be used instead of the digital control oscillator.

In the optical transmission system having the above configuration, on the transmission side, since the SOP of the optical signal immediately after being polarization multiplexed is rotated at a high speed during the time shorter than the time corresponding to the frame length of the error correction frame, characteristic variations between the X polarization channel and the Y polarization channel are averaged in the error correction frame. Then by performing polarization separation of the received signal following the polarization scramble on the transmission side, the influence of the characteristic variations between the different polarization channels is substantially eliminated. Accordingly, deterioration of the error correction performance due to a decrease in the random nature of the error in the received signal as seen in the conventional system can be suppressed.

In the fifth embodiment, an example in which the polarization separating section 36 is arranged in the previous stage of the light receiving section 31 in the optical receiver 30, and polarization rotation and polarization separation of the received signal are performed in the subsequent stage is shown. However, for example, processing corresponding to the polarization rotation and polarization separation can be performed in the digital signal processing circuit (refer to FIG. 17) in the light receiving section 31.

Moreover in the first to the fifth embodiments, a system configuration example in which the optical transmitter 10 and the optical receiver 30 are arranged at the opposite ends of the transmission line 20, and the optical signal is transmitted in one direction from the optical transmitter 10 to the optical receiver 30 is shown. However, the present invention is also applicable to a system in which the optical signal is transmitted in both directions via an up link and a down link. In the case of both directions, the system configuration becomes such that an optical transmitter-receiver is formed by combining the optical transmitter 10 and the optical receiver 30, and the optical transmitter-receiver is arranged as a terminal station or a relay station.

What is claimed is:

1. An optical transmission system comprising: an optical transmitter that transmits an optical signal capable of transmitting multi-bit information within one symbol time and that uses at least a polarization multiplexing system, to a transmission line; and an optical receiver that receives the optical signal propagated through the transmission line, wherein
the optical transmitter comprises:
a transmission signal process circuit having an encode section which generates a transmission signal in which transmission information has been encoded according to a preset format, and a detection bit addition section which imparts a detection bit having a specific pattern set according to a number of bits to be transmitted within one symbol time with respect to the transmission signal generated by the encode section, the detection bit is used in order to detect logic inversion or bit swap in the optical receiver;
a light source; and
an optical modulation section which transmits an optical signal generated by modulating an output light from the light source to the transmission line according to the transmission signal imparted with the detection bit output from the transmission signal process circuit, and
the optical receiver comprises:
a light reception section which receives the optical signal propagated through the transmission line and converts the optical signal into an electric signal; and
a received signal process circuit having a detection compensation section which detects at least one of logic inversion and bit swap in received data by using the detection bit included in a received signal output from the light reception section to compensate the logic inversion or bit swap according to the detection result, and a decode section which executes decoding of the received signal output from the detection compensation section,
wherein when the optical signal transmitted from the optical transmitter to the transmission line is capable of transmitting $2^n$-bit information within one symbol time with n as a positive number,
the detection bit addition section, for the first to the n-th channels comprising $2^{n+1} \times n$ bit strings, defined by the bit strings sequentially picked up in a $2^n$-bit interval from the i-th bit (i=1, 2, ..., $2^n$) from the head, imparts to the transmission signal, the detection bit in which a value obtained by sequentially calculating the exclusive OR for 2-bit combinations before and after the bit string in each channel is set to be different from each other in the respective channels.

2. An optical transmission system according to claim 1, wherein the detection compensation section uses the detection bit included in a received signal output from the light reception section, to detect and compensate the bit swap in received data, and then performs detection and compensation of logic inversion in received data that has been bit swap compensated.

3. An optical transmission system according to claim 1, wherein the detection bit addition section, imparts to the transmission signal, the detection bit that has been set so that the top $2^n$-bits are the same sign.

4. An optical transmission system according to claim 1, wherein the light reception section has a local oscillator light source, and uses local oscillator light output from the local oscillator light source to coherently receive the optical signal propagated through the transmission line.

5. An optical transmission system according to claim 1, wherein the light reception section directly detects the optical signal propagated through the transmission line.

6. An optical transmission system according to claim 1, wherein the transmission signal process circuit comprises a sub-frame encode section that generates a transmission signal to which an error correction code has been added for each predetermined frame by the encode section, and for each error correction frame of the transmission signal generated by the encode section, defines a plurality of sub-frames that have a frame length shorter that the frame length of the error correction frame, and in which a detection bit imparted by the detection bit addition section, is included in a header, and
the light reception section has a local oscillator light source, and uses local oscillator light output from the local oscillator light source to coherently receive the optical signal propagated through the transmission line, and
the received signal process circuit comprises a sub-frame decode section that decodes the received signal output from the light reception section, and makes this a state in which the detection bit included in the header of the sub-frames is identifiable, and the detection compensation section uses the detection bit included in the header of the sub-frames to detect and compensate at least one of the logic inversion and bit swap of the received data.

7. An optical transmission system according to claim 1, wherein a header of an OTN frame is used as the detection bit.

8. An optical transmission method for transmitting an optical signal capable of transmitting multi-bit information within one symbol time and using at least a polarization multiplexing system, to a transmission line, and receiving the optical signal propagated through the transmission line, the method comprising:
generating a transmission signal in which transmission information has been encoded according to a preset format;
imparting a detection bit having a specific pattern set according to a number of bits to be transmitted within one symbol time with respect to the generated transmission signal, the detection bit is used in order to detect logic inversion or bit swap at the time of receiving process;
transmitting an optical signal generated by modulating a light to the transmission line according to the transmission signal imparted with the detection bit;

receiving the optical signal propagated through the transmission line and converting the optical signal into an electric signal;

detecting at least one of logic inversion and bit swap in received data by using the detection bit included in the converted received signal and compensating the logic inversion or bit swap according to the detection result; and executing decoding of the compensated received signal, wherein when the optical signal transmitted to the transmission line is capable of transmitting $2^n$-bit information within one symbol time with n as a positive number, the operation of imparting a detection bit, for the first to the n-th channels comprising $2^{n+1} \times n$ bit strings, defined by the bit strings sequentially picked up in a $2^n$-bit interval from the i-th bit (i=1, 2, ..., $2^n$) from the head, imparts to the transmission signal, the detection bit in which a value obtained by sequentially calculating the exclusive OR for 2-bit combinations before and after the bit string in each channel, is set to be different from each other in the respective channels.

9. An optical transmission system comprising: an optical transmitter that transmits an optical signal capable of transmitting information in three bits or more within one symbol time, to a transmission line; and an optical receiver that receives the optical signal propagated through the transmission line, wherein the optical transmitter comprises:

a transmission signal process circuit having an encode section which generates a transmission signal in which transmission information has been encoded according to a preset format, and a detection bit addition section which imparts a detection bit having a specific pattern set according to a number of bits to be transmitted within one symbol time with respect to the transmission signal generated by the encode section, the detection bit is used in order to detect logic inversion or bit swap in the optical receiver;

a light source; and an optical modulation section which transmits an optical signal generated by modulating an output light from the light source to the transmission line according to the transmission signal imparted with the detection bit output from the transmission signal process circuit, and the optical receiver comprises:

a light reception section which receives the optical signal propagated through the transmission line and converts the optical signal into an electric signal; and a received signal process circuit having a detection compensation section which detects at least one of logic inversion and bit swap in received data by using the detection bit included in a received signal output from the light reception section to compensate the logic inversion or bit swap according to the detection result, and a decode section which executes decoding of the received signal output from the detection compensation section, wherein when the optical signal transmitted from the optical transmitter to the transmission line is capable of transmitting $2^n$-bit information within one symbol time with n as a positive number, the detection bit addition section, for the first to the n-th channels comprising $2^{n+1} \times n$ bit strings, defined by the bit strings sequentially picked up in a $2^n$-bit interval from the i-th bit (i=1, 2, ..., $2^n$) from the head, imparts to the transmission signal, the detection bit in which a value obtained by sequentially calculating the exclusive OR for 2-bit combinations before and after the bit string in each channel is set to be different from each other in the respective channels.

10. An optical transmission method for transmitting an optical signal capable of transmitting information in three bits or more within one symbol time, to a transmission line, and receiving the optical signal propagated through the transmission line, the method comprising:

generating a transmission signal in which transmission information has been encoded according to a preset format;

imparting a detection bit having a specific pattern set according to a number of bits to be transmitted within one symbol time with respect to the generated transmission signal, the detection bit is used in order to detect logic inversion or bit swap at the time of receiving process;

transmitting an optical signal generated by modulating a light to the transmission line according to the transmission signal imparted with the detection bit;

receiving the optical signal propagated through the transmission line and converting the optical signal into an electric signal;

detecting at least one of logic inversion and bit swap in received data by using the detection bit included in the converted received signal and compensating the logic inversion or bit swap according to the detection result; and executing decoding of the compensated received signal, wherein when the optical signal transmitted to the transmission line is capable of transmitting $2^n$-bit information within one symbol time with n as a positive number, the operation of imparting a detection bit, for the first to the n-th channels comprising $2^{n+1} \times n$ bit strings, defined by the bit strings sequentially picked up in a $2^n$-bit interval from the i-th bit (i=1, ..., $2^n$) from the head, imparts to the transmission signal, the detection bit in which a value obtained by sequentially calculating the exclusive OR for 2-bit combinations before and after the bit string in each channel, is set to be different from each other in the respective channels.

\* \* \* \* \*

UNITED STATES PATENT AND TRADEMARK OFFICE
CERTIFICATE OF CORRECTION

PATENT NO. : 8,351,795 B2
APPLICATION NO. : 12/219863
DATED : January 8, 2013
INVENTOR(S) : Hisao Nakashima et al.

Page 1 of 1

It is certified that error appears in the above-identified patent and that said Letters Patent is hereby corrected as shown below:

In the Claims:

Column 22, Line 48, In Claim 10, delete "$(i=1, \ldots, 2^n)$" and insert -- $(i=1, 2, \ldots, 2^n)$ --, therefor.

Signed and Sealed this
Thirtieth Day of April, 2013

Teresa Stanek Rea
*Acting Director of the United States Patent and Trademark Office*